(12) United States Patent
Wu et al.

(10) Patent No.: US 12,543,219 B2
(45) Date of Patent: Feb. 3, 2026

(54) ELECTRONIC DEVICE AND METHOD FOR USE IN RADIO COMMUNICATION, AND COMPUTER-READABLE STORAGE MEDIUM

(71) Applicant: Sony Group Corporation, Tokyo (JP)

(72) Inventors: Zhikun Wu, Beijing (CN); Chen Sun, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 427 days.

(21) Appl. No.: 18/041,215

(22) PCT Filed: Jan. 15, 2021

(86) PCT No.: PCT/CN2021/072042
§ 371 (c)(1),
(2) Date: Feb. 10, 2023

(87) PCT Pub. No.: WO2022/062280
PCT Pub. Date: Mar. 31, 2022

(65) Prior Publication Data
US 2023/0345530 A1    Oct. 26, 2023

(30) Foreign Application Priority Data
Sep. 27, 2020   (CN) .......................... 202011031950.2

(51) Int. Cl.
*H04W 74/0808*   (2024.01)
*H04L 1/1812*    (2023.01)
*H04W 92/18*     (2009.01)

(52) U.S. Cl.
CPC ....... *H04W 74/0808* (2013.01); *H04L 1/1812* (2013.01); *H04W 92/18* (2013.01)

(58) Field of Classification Search
CPC ............. H04W 74/0808; H04W 92/18; H04W 52/0206; H04W 72/23; H04W 72/40;
(Continued)

(56) References Cited

U.S. PATENT DOCUMENTS

2009/0161610 A1* 6/2009 Kang .................... H04W 16/14
370/329
2018/0146467 A1* 5/2018 Kim ..................... H04W 28/065
(Continued)

FOREIGN PATENT DOCUMENTS

CN       106470485 A      3/2017
CN       106686736 A      5/2017
(Continued)

OTHER PUBLICATIONS

ITL: "Resource allocation for power saving with partial sensing in NR sidelink enhancement", 3GPP Draft; R1-2006873, 3rd Generation Partnership Project (3GPP), Mobile Competence Centre ; 650, Route Des Luciles ; F-06921 Sophia-Antipolos Cedex; France, vol. RAN WG1, No. e-meeting; Aug. 17, 2020-Aug. 28, 2020, Aug. 7, 2020, XP052348244.
(Continued)

*Primary Examiner* — Edan Orgad
*Assistant Examiner* — Malick A Sohrab
(74) *Attorney, Agent, or Firm* — XSENSUS LLP

(57) ABSTRACT

An electronic device includes a processing circuit, configured as: to determine multiple partial sensing windows separated on a time domain, in the multiple partial sensing windows, a user equipment executing sidelink communication performing sensing with respect to at least some time-frequency resources in a resource pool for use in sidelink communication; and to determine a partial sensing-resource selection window and one or more resource selection windows, where the partial sensing-resource selection window
(Continued)

is a time-frequency window defined by multiple earlier partial sensing windows when resource selection is triggered, an occupancy state of time-frequency resources in the partial sensing-resource selection window is known to the user equipment; moreover, the user equipment selects the time-frequency resources in the one or more resource selection windows to execute sidelink transmission, where the partial sensing-resource selection window covers the one or more resource selection windows.

16 Claims, 12 Drawing Sheets

(58) Field of Classification Search
CPC .. H04W 72/02; H04W 72/569; H04L 1/1812; H04L 1/187; H04L 5/0055; H04L 27/0006; Y02D 30/70
See application file for complete search history.

(56) References Cited

U.S. PATENT DOCUMENTS

| | | | |
|---|---|---|---|
| 2019/0394786 A1* | 12/2019 | Parron | H04W 4/46 |
| 2020/0029245 A1* | 1/2020 | Khoryaev | H04W 36/22 |
| 2020/0029340 A1 | 1/2020 | He et al. | |
| 2020/0037358 A1* | 1/2020 | Chae | H04W 74/0808 |
| 2020/0275412 A1* | 8/2020 | Kim | H04L 1/1887 |
| 2020/0314803 A1* | 10/2020 | Zhang | H04W 74/006 |
| 2023/0057486 A1* | 2/2023 | Ye | H04W 72/563 |
| 2023/0084593 A1* | 3/2023 | Hoang | H04W 52/0225 370/311 |
| 2023/0309065 A1* | 9/2023 | Leon Calvo | H04W 72/563 |

FOREIGN PATENT DOCUMENTS

| | | |
|---|---|---|
| CN | 108024318 A | 5/2018 |
| EP | 3522630 A1 | 8/2019 |
| WO | 2017/028747 A1 | 2/2017 |
| WO | 2018/121148 A1 | 7/2018 |
| WO | 2018/145067 A1 | 8/2018 |
| WO | 2020/017939 A1 | 1/2020 |
| WO | 2020/092931 A1 | 5/2020 |

OTHER PUBLICATIONS

International Search Report and Written Opinion mailed on Jun. 30, 2021, received for PCT Application PCT/CN2021/072042, filed on Jan. 15, 2021, 12 pages including English Translation.
Huawei et al., "Discussion on the P-UE resource selection", 3GPP TSG RAN WG1 Meeting #86bis, R1-1608649, Oct. 10-14, 2016, 5 pages.
Intel Corporation, "Mechanisms for Resource Multiplexing among Backhaul and Access links", 3GPP TSG RAN WG1 #99, R1-1912202, Nov. 18-22, 2019, pp. 1-5.
Vivo, "Resource allocation for sidelink power saving", 3GPP TSG RAN WG1 #102-e, R1-2005403, Aug. 17-28, 2020, 6 pages.

* cited by examiner

ELECTRONIC DEVICE AND METHOD FOR USE IN RADIO COMMUNICATION, AND COMPUTER-READABLE STORAGE MEDIUM

CROSS-REFERENCE TO RELATED APPLICATIONS

The present application is based on PCT filing PCT/CN2021/072042, filed on Jan. 15, 2021, which claims priority to Chinese Patent Application No. 202011031950.2, titled "ELECTRONIC DEVICE AND METHOD FOR USE IN RADIO COMMUNICATION, AND COMPUTER-READABLE STORAGE MEDIUM", filed on Sep. 27, 2020 with the China National Intellectual Property Administration, each of which is incorporated herein by reference in its entirety.

FIELD

The present disclosure relates to the technical field of wireless communications, and in particular to a resource selection/reselection technology in an energy saving mode of a sidelink (SL) communications. More specifically, the present disclosure relates to an electronic apparatus and a method for wireless communications, and a computer-readable storage medium.

BACKGROUND

In the sidelink communications, user equipments (UEs) directly communicate with each other using certain time-frequency resources. The certain time-frequency resources may be configured by a base station for the UE (called mode 1), or may be autonomously selected by the UE from a resource pool configured for the sidelink communications (called mode 2).

In the mode 2, the UE may operate in a "normally open" state. In the "normally open" state, it is required for the UE to continuously sense a state of a channel, report a measurement result, and dynamically select time-frequency resources in real time, that is, the UE operates in a full sensing mode, resulting in a great burden for a power consumption sensitive device and further affecting the life of the battery. Therefore, the UE may operate in a partial sensing mode to reduce the power consumption. In the partial sensing mode, the UE only senses the state of the channel during a part of time. For ease of understanding, FIG. 1 and FIG. 2 respectively show a schematic diagram of full sensing and a schematic diagram of partial sensing.

As shown in FIG. 1, in the full sensing mode, a full sensing window is continuous in time. The UE continuously senses a state of a channel, and determines time-frequency resources to be occupied in a resource selection window based on sensed time-frequency resources that have been occupied and a periodicity of a service, thereby excluding the time-frequency resources in performing resource selection to avoid collisions. As shown in FIG. 2, in the partial sensing mode, a full sensing window is divided into multiple sub windows. The UE only senses a state of a channel in a part of time of a part of sub windows. The part of time is called a partial sensing window. Accordingly, the UE may perform resource selection based on a partial sensing result.

SUMMARY

In the following, an overview of the present disclosure is given simply to provide basic understanding to some aspects of the present disclosure. It should be understood that this overview is not an exhaustive overview of the present disclosure. It is not intended to determine a critical part or an important part of the present disclosure, nor to limit the scope of the present disclosure. An object of the overview is only to give some concepts in a simplified manner, which serves as a preface of a more detailed description described later.

According to an aspect of the present disclosure, an electronic apparatus for wireless communications is provided. The electronic apparatus includes processing circuitry. The processing circuitry is configured to: determine a plurality of partial sensing windows separated from each other in a time domain, where in the plurality of partial sensing windows, a user equipment performing sidelink communications senses at least a part of time-frequency resources in a resource pool for the sidelink communications; and determine a partial sensing-resource selection window and one or more resource selection windows, where the partial sensing-resource selection window is a time-frequency window defined by multiple previous partial sensing windows after triggering a resource selection, an occupancy state of time-frequency resources in the partial sensing-resource selection window is known to the user equipment, and the user equipment selects time-frequency resources in the one or more resource selection windows to perform the sidelink communications. The partial sensing-resource selection window covers the one or more resource selection windows.

According to another aspect of the present disclosure, a method for wireless communications is provided. The method includes: determining a plurality of partial sensing windows separated from each other in a time domain, where in the plurality of partial sensing windows, a user equipment performing sidelink communications senses at least a part of time-frequency resources in a resource pool for the sidelink communications; and determining a partial sensing-resource selection window and one or more resource selection windows, where the partial sensing-resource selection window is a time-frequency window defined by multiple previous partial sensing windows after triggering a resource selection, an occupancy state of time-frequency resources in the partial sensing-resource selection window is known to the user equipment, and the user equipment selects time-frequency resources in the one or more resource selection windows to perform the sidelink communications. The partial sensing-resource selection window covers the one or more resource selection windows.

According to the electronic apparatus and the method in the above aspects of the present disclosure, a partial sensing-resource selection window is configured, and the partial sensing-resource selection window covers the resource selection windows, so that resource selection can be performed among time-frequency resources with a known occupancy state, thereby reducing the probability of resources collision in an energy-saving mode such as partial sensing, and improving the reliability of sidelink communications.

According to an aspect of the present disclosure, an electronic apparatus for wireless communications is provided. The electronic apparatus includes processing circuitry. The processing circuitry is configured to: generate a resource pool configuration signaling for configuring a resource pool for sidelink communications, where the resource pool configuration signaling includes: indication information indicating whether the resource pool allows a user equipment not performing channel sensing to perform data transmission, or indication information indicating which part of the resource pool allows a user equipment not performing channel sensing to perform data transmission; and transmit the resource pool configuration signaling to the user equipment.

According to another aspect of the present disclosure, a method for wireless communications is provided. The method includes: generating a resource pool configuration signaling for configuring a resource pool for sidelink communications, where the resource pool configuration signaling includes: indication information indicating whether the resource pool allows a user equipment not performing channel sensing to perform data transmission, or indication information indicating which part of the resource pool allows a user equipment not performing channel sensing to perform data transmission; and transmitting the resource pool configuration signaling to the user equipment.

According to an aspect of the present disclosure, an electronic apparatus for wireless communications is provided. The electronic apparatus includes processing circuitry. The processing circuitry is configured to: randomly select time-frequency resources in a resource pool for sidelink communications and generate sidelink control information, where the sidelink control information includes one of: indication information indicating that a user equipment does not perform channel sensing on corresponding time-frequency resources, and priority level information of a data packet, where the data packet is adjusted to have the highest priority level; and transmit the sidelink control information to other user equipment.

According to another aspect of the present disclosure, a method for wireless communications is provided. The method includes: randomly selecting time-frequency resources in a resource pool for sidelink communications and generating sidelink control information, where the sidelink control information includes one of: indication information indicating that a user equipment does not perform channel sensing on corresponding time-frequency resources, and priority level information of a data packet, where the data packet is adjusted to have the highest priority level; and transmitting the sidelink control information to other user equipment.

According to the electronic apparatuses and the methods in the above aspects of the present disclosure, resource collisions between the user equipment that does not perform channel sensing in randomly selecting time-frequency resources for sidelink communications and other user equipment can be reduced.

According to other aspects of the present disclosure, there are further provided computer program codes and computer program products for implementing the methods for wireless communications above, and a computer-readable storage medium having recorded thereon the computer program codes for implementing the methods for wireless communications described above.

These and other advantages of the present disclosure will be more apparent from the following detailed description of preferred embodiments of the present disclosure in conjunction with the accompanying drawings.

BRIEF DESCRIPTION OF THE DRAWINGS

To further set forth the above and other advantages and features of the present disclosure, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present disclosure and should not be construed as a limitation to the scope of the disclosure. In the accompanying drawings.

DETAILED DESCRIPTION OF EMBODIMENTS

An exemplary embodiment of the present disclosure will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a service, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present disclosure due to unnecessary details, only a device structure and/or processing steps closely related to the solution according to the present disclosure are illustrated in the accompanying drawing, and other details having little relationship to the present disclosure are omitted.

First Embodiment

As mentioned above, in the partial sensing mode, the sensing for the channel state by the UE is incomplete, and thus many collisions may occur when performing resource selection based on a partial sensing result. To reduce the probability of collision and improve the communication reliability, a solution for resource selection/reselection in a partial sensing mode is provided according to the embodiment of the present disclosure.

Figure 3:
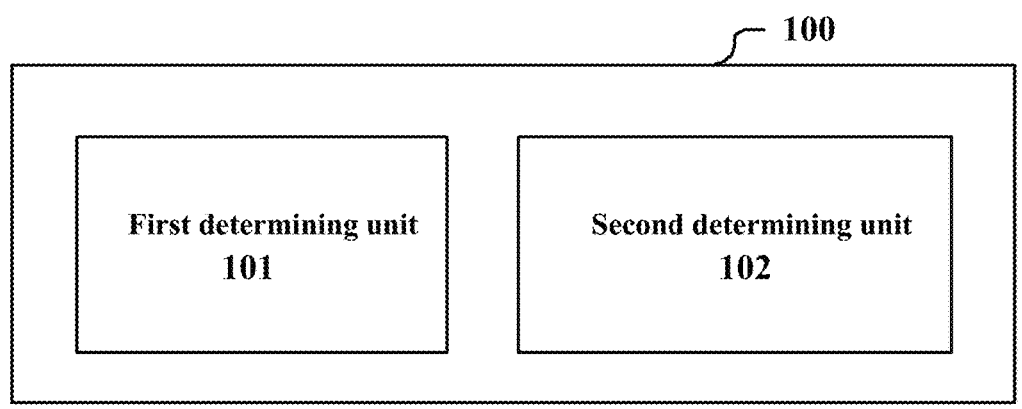
FIG. 3 shows a functional block diagram of an electronic apparatus for wireless communications according to an embodiment of the present disclosure.

FIG. 3 shows a functional block diagram of an electronic apparatus 100 for wireless communications according to an embodiment of the present disclosure. As shown in FIG. 3, the electronic apparatus 100 includes a first determining unit 101 and a second determining unit 102. The first determining unit 101 is configured to determine a plurality of partial sensing windows separated from each other in a time domain. In the plurality of partial sensing windows, a UE performing sidelink communications senses at least a part of time-frequency resources in a resource pool for the sidelink communications. The second determining unit 102 is configured to determine a partial sensing-resource selection window and one or more resource selection windows. The partial sensing-resource selection window is a time-frequency window defined by a plurality of previous partial sensing windows after triggering resource selection, an occupancy state of time-frequency resources in the partial sensing-resource selection window is known to the user equipment, and the user equipment selects time-frequency resources in the one or more resource selection windows to perform the sidelink communications. The partial sensing-resource selection window covers the one or more resource selection windows.

Figure 1:
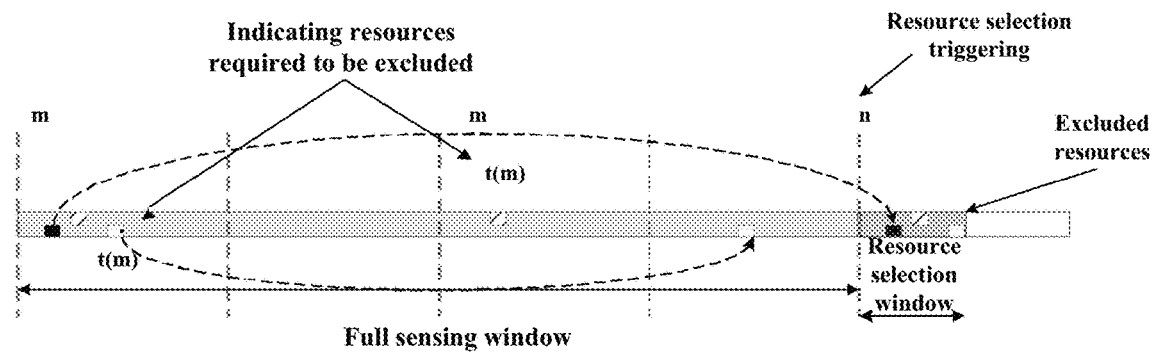
FIG. 1 shows a schematic diagram of a full sensing mode.
Figure 2:
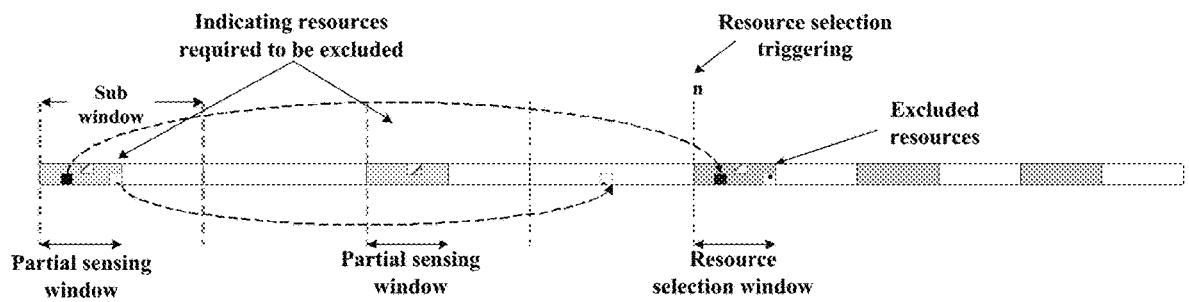
FIG. 2 shows a schematic diagram of a partial sensing mode.

The first determining unit 101 and the second determining unit 102 may be implemented by one or more processing circuitry, and the processing circuitry, for example, may be implemented as a chip. Moreover, it should be understood that, functional units in the apparatus shown in FIG. 1 are only logic modules which are divided based on the specific functions thereof, and are not intended to limit the implementations.

The electronic apparatus 100, for example, may be arranged on a UE side or may be communicatively connected to the UE. It should be further noted that the electronic apparatus 100 may be implemented at a chip level or a device level. For example, the electronic apparatus 100 may function as the UE itself, and may include an external device such as a memory and a transceiver (not shown in FIG. 3). The memory may store programs and related data information for implementing various functions by the UE. The transceiver may include one or more communication interfaces to support communication with different devices (for example, a base station, other UEs or the like). The implementation of the transceiver is not limited herein.

It should be understood that the terms such as first and second are used only for distinguishing, and do not represent any meaning such as order or priority level.

In the plurality of partial sensing windows determined by the first determining unit 101, the UE senses corresponding time-frequency resources to determine which time-frequency resources are occupied. For example, a partial sensing window may be defined by defining a start position and an end position of the partial sensing window. In addition, the plurality of partial sensing windows may be set periodically or non-periodically.

After triggering the resource selection, the second determining unit 102 determines the partial sensing-resource selection window defined by the partial sensing windows. The UE may determine an occupancy state of resources in the partial sensing-resource selection window based on the channel sensing results in the partial sensing windows. In addition, the second determining unit 102 further determines one or more resource selection windows in the partial sensing-resource selection window, so that collision can be effectively avoided in performing resource selection in the resource selection windows, thereby improving communication reliability.

Figure 4:
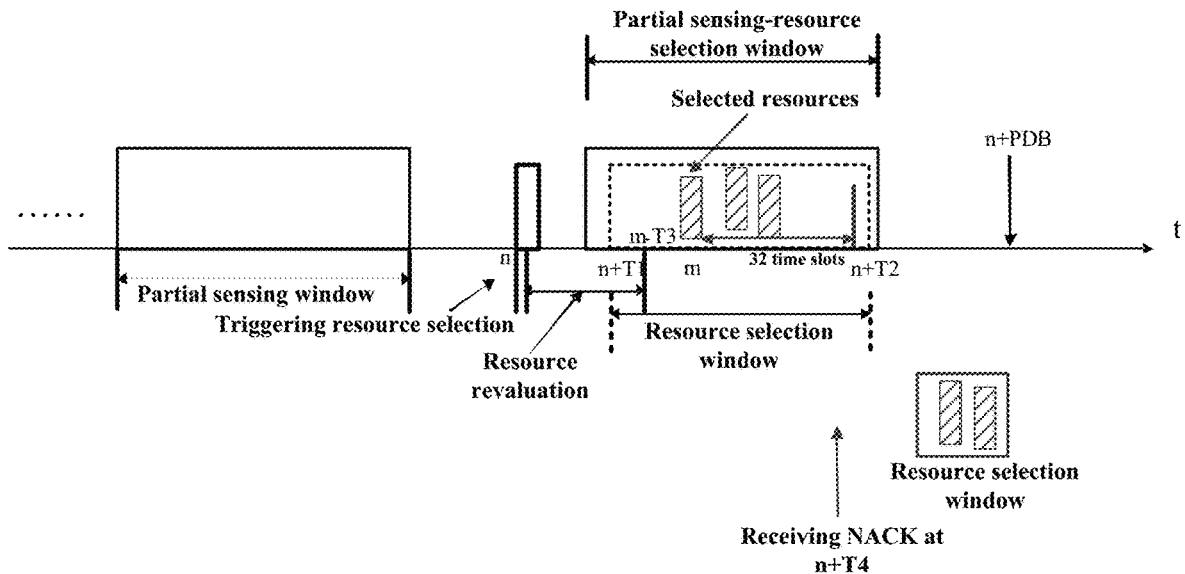
FIG. 4 shows an exemplary schematic diagram of a partial sensing-resource selection window and a resource selection window according to the embodiment.

For ease of understanding, FIG. 4 shows an exemplary schematic diagram of a partial sensing-resource selection window and a resource selection window according to an embodiment of the present disclosure. A resource selection/reselection operation in the embodiment is to be described below in conjunction with FIG. 4. However, it should be understood that FIG. 4 is not restrictive and is only provided for the convenience of illustration.

In the example shown in FIG. 4, the UE has a packet to be transmitted at a time instant n, and thus the resource selection is triggered. Based on a sensing result in the previous partial sensing windows, the second determining unit 102 determines a partial sensing-resource selection window shown in FIG. 4. A resource selection window is located inside the partial sensing-resource selection window, and the UE selects time-frequency resources within the resource selection window to perform sidelink communications. A starting position n+T1 of the resource selection window depends on the processing capability of the UE. For example, the higher processing capability of the UE is, the smaller the T1 is. The end position n+T2 of the resource selection window, for example, depends on a priority level of the packet to be transmitted. The higher priority level is, the smaller the T2 is. PDB (packet delay budget) represents a maximum allowable transmission delay of a data packet. It may be seen that the end position of the resource selection window should not exceed n+PDB.

After triggering the resource selection, the UE is required to perform resource reevaluation before performing transmission using the selected time-frequency resources to further confirm whether the time-frequency resources is not occupied. Taking FIG. 4 as an example, the UE selects time-frequency resources at a time instant m. In a case that the UE does not sense that the resources are occupied until a time instant m−T3, the UE performs transmission using the time-frequency resources at the time instant m. In a case that the UE senses that the resources are occupied before a time instant m−T3, the UE performs resource reselection.

In the resource selection window shown in FIG. 4, the UE selects no more than three resource blocks within 32 time slots to perform hybrid automatic retransmission reQuest (HARQ) transmission or perform blind transmission. In a case of performing HARQ transmission, a transmitting UE receives an ACK message or an NACK message from a receiving UE to determine whether a transmitted data packet has been successfully received by the receiving UE. If the transmitting UE receives the NACK message, the transmitting UE determines that the receiving UE has not successfully received the data packet and then retransmits the data packet. For example, as shown in FIG. 4, the UE receives an NACK as feedback from the receiving UE at a time instant n+T4, then the UE determines it is required to perform retransmission. For example, the UE may select time-frequency resources in a new resource selection window.

The partial sensing-resource selection window may have the same size in time domain (hereinafter referred to as W) as the partial sensing window, which leads to the best energy saving effect. Alternatively, the partial sensing-resource selection window may have a size in time domain less than that of the partial sensing window.

In order to meet a delay requirement of a data packet, an upper limit of the time domain size W of the partial sensing-resource selection window is equal to a maximum allowable transmission delay of a data packet, that is, the largest W does not exceed the maximum allowable transmission delay PDB of the data packet.

For a lower limit of W, in a case that the UE performs blind transmission, there is no obvious interval in the time domain between the initial transmission and retransmission, and thus the lower limit of W is not particularly limited. In a case that the UE performs HARQ transmission, if it is required to complete all transmissions in the partial sensing-resource selection window, the second determining unit 102 may determine the lower limit of the time domain size W of the partial sensing-resource selection window based on a maximum transmission number (N_max) of a single data packet in the HARQ transmission.

Figure 5:
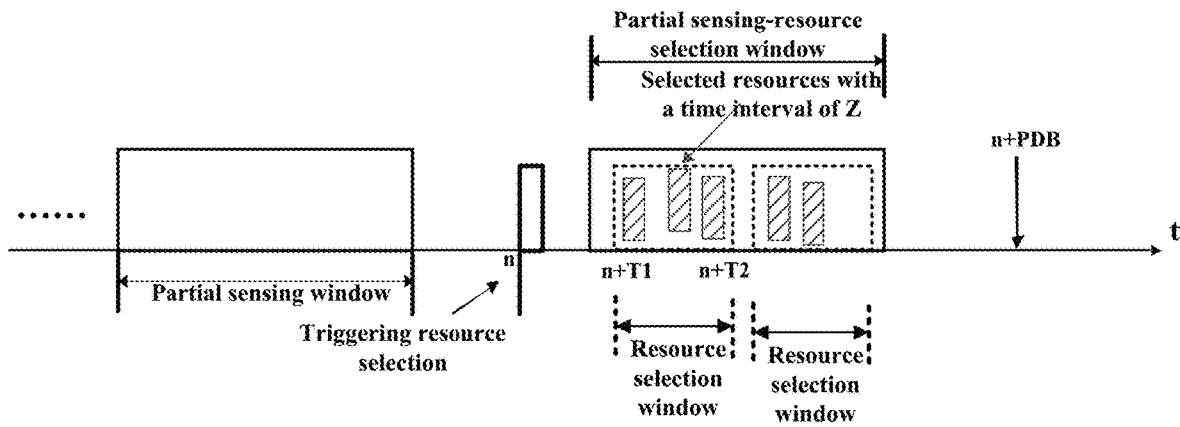
FIG. 5 shows an example of a lower limit of a time domain size of a partial sensing-resource selection window.

For example, the second determining unit 102 may determine the lower limit of W as a product of N_max−1 and a time interval Z between two transmissions of a single data packet, that is, W≥(N_max−1)*Z. The time interval Z between two transmissions may be a maximum time interval, a minimum time interval or an average time interval between two transmissions in the HARQ transmission. FIG. 5 shows an example of a lower limit of a time domain size of a partial sensing-resource selection window in HARQ transmission. In the example shown in FIG. 5, N_max is 5, and thus W≥4*Z.

Alternatively, the second determining unit 102 may determine the lower limit of W as a total time domain size of resource selection windows crossed by a HARQ transmission having the maximum number of times of transmission. The size of the resource selection window is equal to T2−T1, and the number of the resource selection windows crossed by the HARQ transmission having the maximum number of times of transmission N_max is N_w=ceil(N_max/K), where K represents a maximum number of times of selecting time-frequency resources in one resource selection in each resource selection window, for example, K=3. The lower limit of W may be expressed as W≥N_w*(T2−T1). Still referring to the example shown in FIG. 5, N_w=2, and thus W≥2*(T2−T1).

On the other hand, if it is not required to perform all transmissions in the partial sensing-resource selection window, the lower limit of W is a lower limit of the time domain size of the resource selection window, that is, W≥T2−T1.

In the partial sensing-resource selection window, the UE may perform resource selection and channel sensing, or may only perform resource selection, or may perform resource selection and channel sensing partially, which is not limited herein.

In addition, although as shown in FIGS. 4 and 5, the partial sensing window, the partial sensing-resource selection window and the resource selection window are continuous in the time domain, the three windows may be discontinuous in the time domain, which is not limited herein.

As mentioned above, in the case that the time-frequency resources selected by the UE are occupied before transmission, it is required for the UE to perform resource reselection. In HARQ transmission, the UE performs multiple retransmissions, and thus it is required to select time-frequency resources for the retransmissions in a new resource selection window. Therefore, there may be a case in which the resource reselection window or the new resource selection window exceeds the partial sensing-resource selection window, in other words, it may be required to select time-frequency resources with an unknown resource occupancy state.

Accordingly, the second determining unit 102 may be further configured to: in a case of sensing that the selected time-frequency resources are occupied, activate a resource reselection window to perform resource reselection, and dynamically adjust an end boundary of the resource reselection window to make it not exceed the partial sensing-resource selection window; and/or in a case of determining to perform retransmission in HARQ transmission and it is necessary to activate a new resource selection window, dynamically adjust an end boundary of the new resource selection window to make it not exceed the partial sensing-resource selection window.

Figure 6:
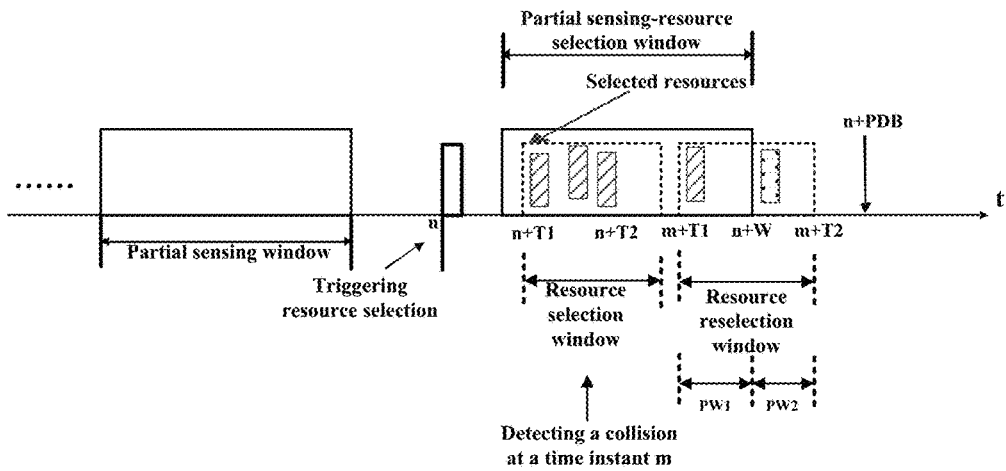
FIG. 6 shows a schematic example of a resource reselection window partially overlapping with a partially sensing-resource selection window.

FIG. 6 shows a schematic example of dynamically adjusting an end boundary of a resource reselection window. In the example shown in FIG. 6, the UE selects three time-frequency resource blocks in the resource selection window for transmission. However, it is detected that a collision occurs on a third time-frequency resource block at a time instant m, that is, another UE occupies the time-frequency resource block, and then it is required for the UE to perform resource reselection and active a resource reselection window that starts at a time instant m+T1 and ends at a time instant m+T2. However, the end boundary of the resource reselection window exceeds a boundary n+W of the partial sensing-resource selection window. The part on the left side of n+W is represented by PW1, and the part on the right side of n+W is represented by PW2. It should be noted that although in the example shown in FIG. 6, the end boundary of the resource reselection window does not exceed n+PDB, the end boundary of the resource reselection window may exceed n+PDB, which is not limited herein.

In the embodiment, the second determining unit 102, for example, only selects time-frequency resources in PW1 and does not select time-frequency resources in PW2 as shown in FIG. 6. However, due to the small range of PW1, it is difficult to select available time-frequency resources suitable for transmission, and the second determining unit 102 would terminate transmitting of the block to be transmitted in advance. Although FIG. 6 shows a resource reselection window as an example, there is a similar case for the resource selection window, which is not repeated herein.

In addition, in the part of the resource reselection window or the resource selection window exceeding the partial sensing-resource selection window (such as, in PW 2 shown in FIG. 6), the second determining unit 102 may be further configured to select time-frequency resources in one of the following manners: performing random selection, performing selection based on a resource sensing result in the partial sensing-resource selection window or a resource sensing result in the resource reselection window or in the resource selection window, and a combination thereof. No matter which manner is to be adopted, the range of resource selection should not exceed the limit of n+PDB. The resource sensing result in the resource reselection window or the resource sensing result in the resource selection window may respectively be a temporary resource sensing result in the resource reselection window or a temporary resource sensing result in the resource selection window.

In the manner of performing random selection, the UE selects time-frequency resources in the resource pool in a completely random way. In the manner of performing selection based on the resource sensing result in the partial sensing-resource selection window, the UE performs channel sensing in the partial sensing-resource selection window to determine which time-frequency resources are not occupied, and the UE performs resource selection on unoccupied time-frequency resources, where the selection may be random.

Figure 7:
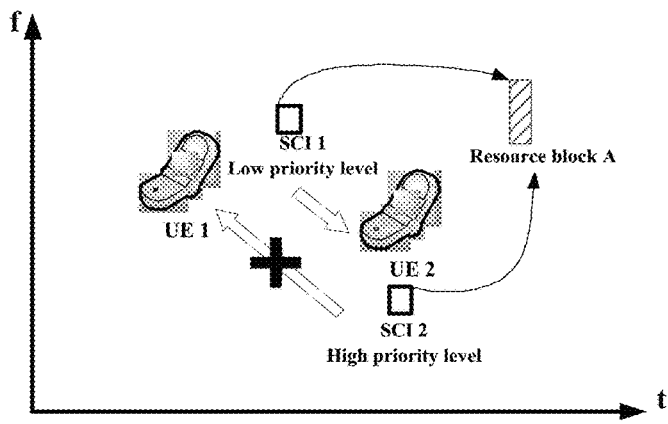
FIG. 7 shows a schematic diagram of a high priority level service occupying time-frequency resources of a low priority level service in a case of resource collision occurring.

In the manner of performing random selection on time-frequency resources, if a collision occurs, it may be determined based on priority levels of data packets from different UEs which UE may use selected time-frequency resources. FIG. 7 shows a schematic diagram where a service with a high priority level occupying time-frequency resources of a service with a low priority level in a case of resource collision occurring. However, if the UE randomly selecting time-frequency resources, such as the UE1 in FIG. 7, does not perform channel sensing after selecting resources, the UE cannot sense the occupation of the selected resources by another UE with a higher priority level of the data packet, such as the UE2 in FIG. 7, the UE performs transmission still using the selected resources, resulting in unavoidable collisions.

In the embodiment, for example, in PW2, in a case that the UE performs sidelink transmissions using randomly selected time-frequency resources and does not perform channel sensing, the UE may notify other UEs of the fact that the UE does not perform channel sensing on the corresponding time-frequency resources to avoid collisions with other UEs, so that other UEs do not occupy the time-frequency resources to avoid collisions. Alternatively, a data packet transmitted using the time-frequency resources may be adjusted to have the highest priority level, so that other UEs cannot occupy the time-frequency resources.

For example, the second determining unit 102 may be configured to include one of the following information in sidelink control information (SCI): indication information indicating that the UE does not perform channel sensing on the randomly selected time-frequency resources; and priority level information of a data packet, where the data packet is adjusted to have the highest priority level.

It should be noted that the adjusted priority level of the packet is only notified to other UEs, and it is required for the UE itself to maintain the real priority level of the packet. For example, in a case that a conflict occurs between sidelink communications and uplink transmission, it is determined which data packet is to be transmitted firstly by comparing the real priority level with a priority level of an uplink data packet.

Figure 8:
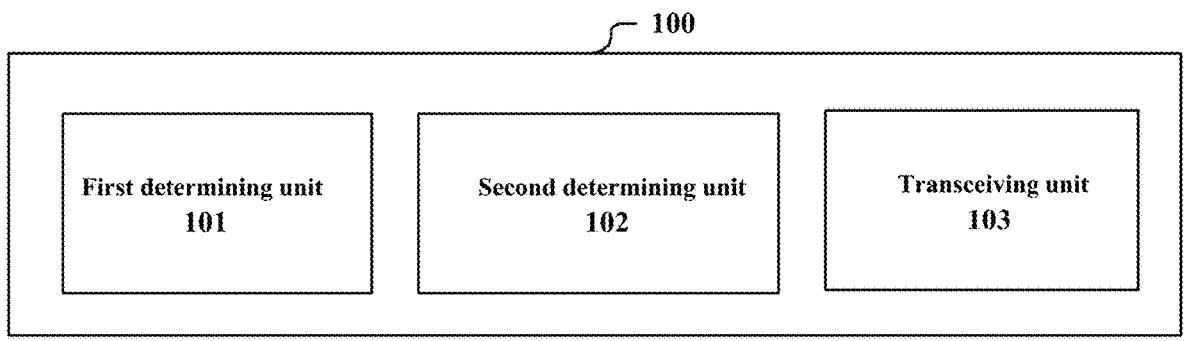
FIG. 8 shows a functional block diagram of an electronic apparatus for wireless communications according to an embodiment of the present disclosure.

As shown in FIG. 8, the electronic apparatus 100 further includes a transceiving unit 103. The transceiving unit 103 is configured to transmit SCI to other UEs.

In addition, the transceiving unit 103 is further configured to receive SCI from other UEs. The SCI includes one of the following: indication information indicating that the other user equipment does not perform channel sensing on corresponding time-frequency resources; and data packet priority level information indicating that data packets transmitted by the other user equipment using the corresponding time-frequency resources have the highest priority level. The second determining unit 102 is configured to cause the UE not to occupy the corresponding time-frequency resources to perform data transmission.

On the other hand, the collisions may be avoided by configuring the resource pool by the base station side. In an example, the transceiving unit 103 may be configured to receive a resource pool configuration signaling from a base station.

The resource pool configuration signaling, for example, may indicate whether the resource pool allows the UE not performing channel sensing to perform data transmission, or may configure a part of the resource pool to allow the UE not performing channel sensing to perform data transmission. The second determining unit 102 is configured to randomly select time-frequency resources in this part of the resource pool to perform the sidelink transmissions and not perform channel sensing.

Figure 9:
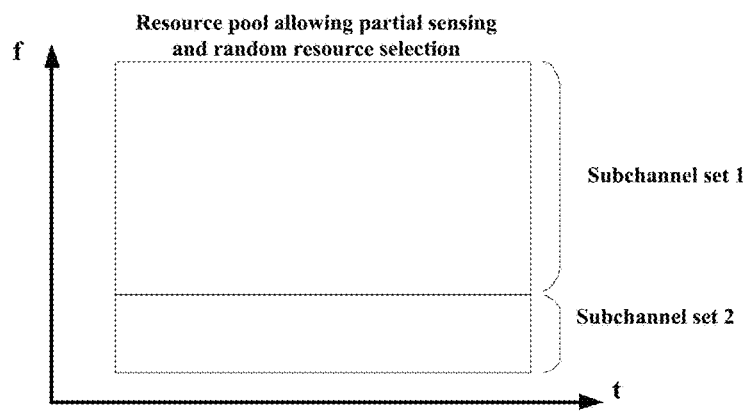
FIG. 9 shows a schematic diagram of further dividing a resource pool.

FIG. 9 shows a schematic diagram of further dividing a resource pool. FIG. 9 shows a resource pool allowing partial sensing and random resource selection. The resource pool is divided into two parts: subchannel set 1 and subchannel set 2. Resources in the subchannel set 1 do not allow UEs not performing channel sensing to perform data transmission. For example, in the subchannel set 1, a service having a higher priority level is allowed to occupy time-frequency resources of a service having a lower priority level. Resources in the subchannel set 2 allow UEs not performing channel sensing to perform transmission. For example, in the second subchannel set 2, a service having a higher priority level is not allowed to occupy time-frequency resources of a service having a lower priority level. When the UE is required to perform random resource selection, the second determining unit 102 may be configured to randomly select time-frequency resources from the subchannel set 2. In this way, even if the selected time-frequency resources are also selected by a service having a higher priority level of another UE, the selected time-frequency resources are not to be occupied, thereby reducing collisions.

In summary, with the electronic apparatus 100 according to the embodiment, the partial sensing-resource selection window is configured, and the partial sensing-resource selection window covers the resource selection windows, so that resource selection can be performed on time-frequency resources with a known occupancy state, thereby reducing the probability of resource collision in an energy-saving mode such as partial sensing and improving the reliability of sidelink communications.

Second Embodiment

Figure 10:
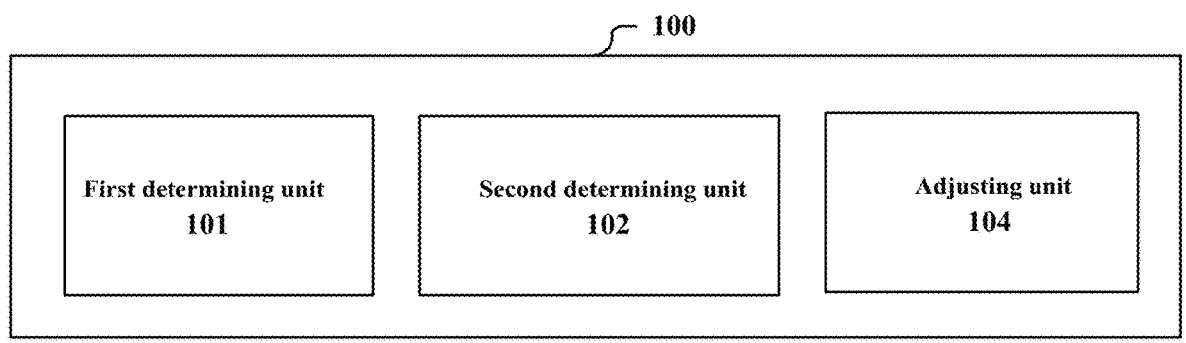
FIG. 10 shows a functional block diagram of an electronic apparatus for wireless communications according to an embodiment of the present disclosure.

FIG. 10 shows a functional block diagram of an electronic apparatus 100 for wireless communications according to another embodiment of the present disclosure. In addition to the first determining unit 101 and the second determining unit 102 described with reference to FIG. 3, the electronic apparatus 100 further includes an adjusting unit 104. The adjusting unit 104 is configured to perform dynamic adjustment on a frequency domain range of each of the partial sensing windows. Although the transceiving unit 103 is not shown in FIG. 10, the electronic apparatus 100 according to the embodiment may further include the transceiving unit 103.

By performing dynamic adjustment on the frequency domain range of each of the partial sensing windows, a frequency domain range of a channel to be sensed by the UE can be dynamically adjusted, thus further improving the energy saving efficiency.

For example, the transceiving unit 103 may receive an adjustment instruction from a base station, and the adjusting unit 104 performs the dynamic adjustment based on the adjustment instruction. Alternatively, the adjusting unit 104 may perform the dynamic adjustment based on a measurement result of the UE. For example, the measurement result may include one or more of: a channel busy ratio (CBR), and feedback information in HARQ transmission.

Exemplarily, in a case that the channel busy ratio (CBR) increases and/or the number of times of feedback of NACK or the number of times of timeout without feedback increases in the HARQ transmission, the frequency domain range of each of the partial sensing windows is increased; and in a case that the channel busy ratio (CBR) decreases and/or the number of times of feedback of NACK or the number of times of timeout without feedback decreases in the HARQ transmission, the frequency domain range of each of the partial sensing windows may be reduced. In the case that the CBR increases, it indicates that the probability of a channel being idle decreases, and the UE may expand the frequency range for sensing to improve transmission reliability. On the contrary, in the case that the CBR decreases, it indicates that the probability of a channel being idle increases, and the UE may reduce the frequency range for sensing to reduce power consumption. Similarly, in the case that the number of times of feedback of NACK or the number of times of timeout without feedback increases in the HARQ transmission, it indicates that the probability of collisions increases and the UE may expand the frequency range for sensing to improve transmission reliability. On the contrary, in the case that the number of times of feedback of NACK or the number of times of timeout without feedback decreases in HARQ transmission, it indicates that the probability of collisions decreases and the UE may reduce the frequency range for sensing to reduce power consumption.

Figure 11:
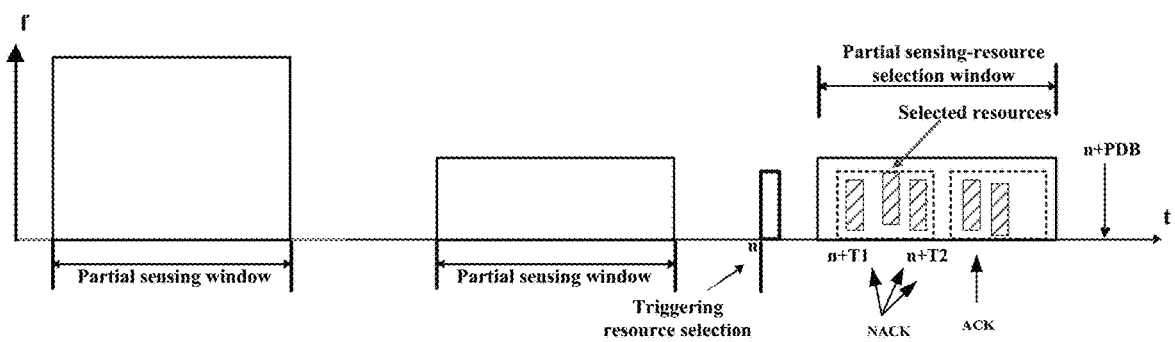
FIG. 11 shows an example of adjusting a frequency domain range of a partial sensing window based on a channel busy ratio.
Figure 12:
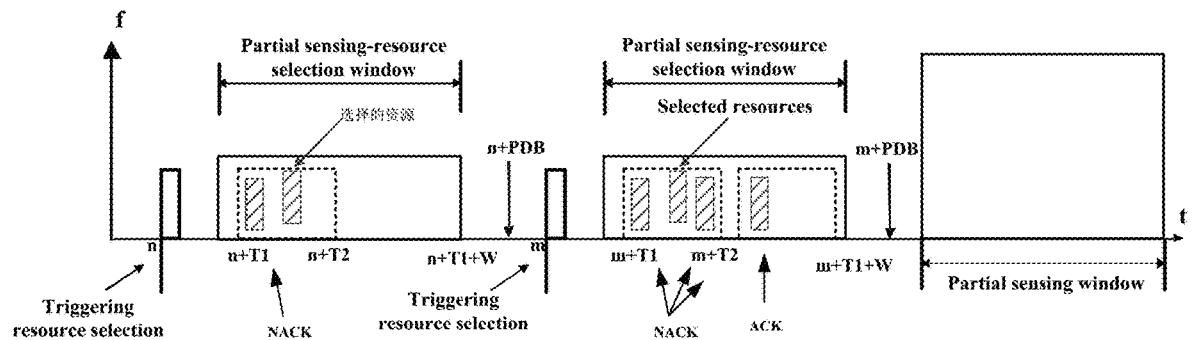
FIG. 12 shows an example of adjusting a frequency domain range of a partial sensing window based on the number of feedback of NACK in a hybrid automatic retransmission request transmission.

FIG. 11 shows an example of adjusting a frequency domain range of a partial sensing window based on a CBR. As shown in FIG. 11, in a first partial sensing window, it is detected that the CBR decreases, and a frequency domain range of a second partial sensing window is reduced. FIG. 12 shows an example of adjusting a frequency domain range of a partial sensing window based on the number of times of feedback of NACK in HARQ transmission. As shown in FIG. 12, when the number of times of the detected NACK in the partial sensing-resource selection window increases, a frequency domain range of a subsequent partial sensing window is increased.

It should be understood that the above description is only an example of dynamically adjusting a frequency domain range of a partial sensing window, and is not restrictive.

With the electronic apparatus 100 according to the embodiment, the frequency domain range of the partial sensing window is dynamically adjusted, thereby further reducing the power consumption of the UE while ensuring the communication reliability.

Third Embodiment

Figure 13:
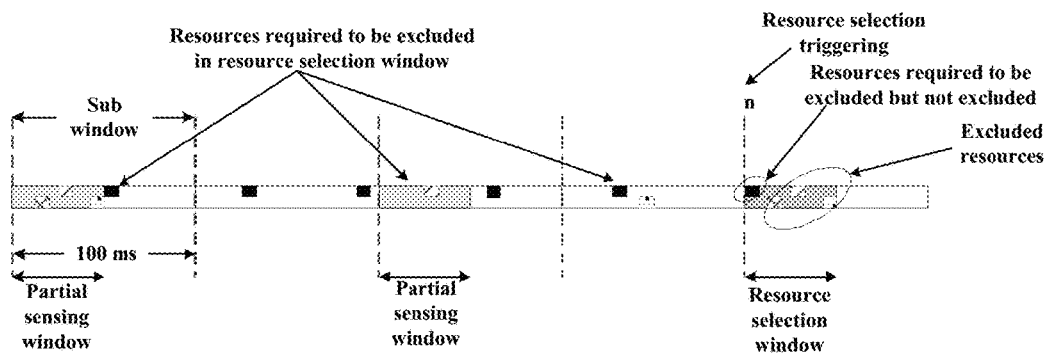
FIG. 13 shows a schematic diagram of a collision caused by missing some data packets in the partial sensing.

Since a partial sensing mode is adopted, it may be incapable of sensing all services, such as a periodic service with a particular period and an aperiodic service, in a partial sensing window. FIG. 13 shows a schematic diagram of a collision caused by missing some data packets in performing partial sensing. In FIG. 13, S represents a size of a sub window, W represents a size of a partial sensing window, and P represents a service period. In a case of 0<P≤W or P being an integral multiple of S, a periodic service with the period P may be sensed in the partial sensing window, so that the periodic service with the period P may be avoided in the resource selection window. In the example shown in FIG. 13, the size of the sub window is set to 100 ms and the size of the partial sensing window is set to 50 ms, and then for periodic services with a period ranging from 1 ms to 50 ms, a period of 100 ms, a period of 200 ms, or the like, the UE performing partial sensing may correctly exclude the resources occupied by the services. However, for a service with a period ranging from 51 ms to 99 ms, such as a service with a period of 70 ms (represented by black squares in FIG. 13), the UE may not be able to sense the service and then does not avoid the service in performing resource selection, resulting in collisions.

Figure 14:
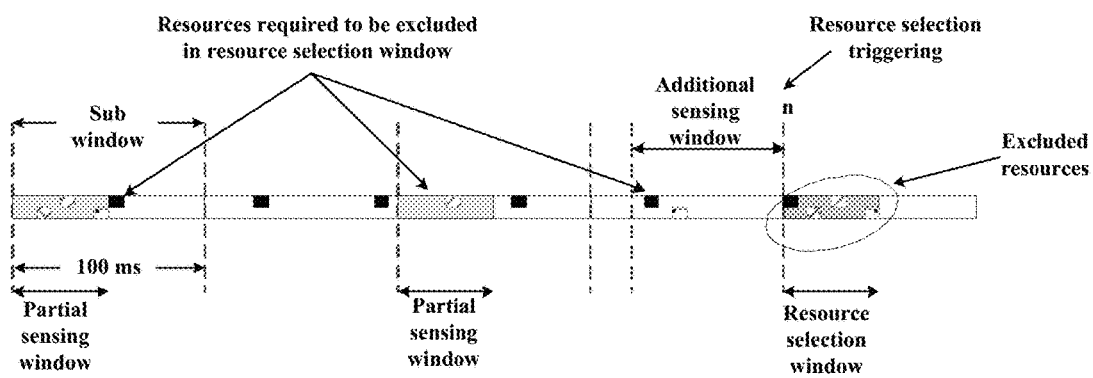
FIG. 14 shows a diagram of a configuration example of an additional sensing window.

Therefore, the second determining unit 102 in the electronic apparatus 100 may be further configured to set an additional sensing window before a starting position of the resource selection window. FIG. 14 shows a diagram of a configuration example of the additional sensing window. It can be seen that by setting the additional sensing window, the service with the period of 70 ms represented by the black squares may be sensed, so that the corresponding time-frequency resource blocks may be excluded in the resource selection window.

For example, a starting position of the additional sensing window depends on a maximum period of each of periodic services which cannot be sensed in the partial sensing window. Assuming that the maximum period is represented by P_max, resource selection is triggered at a time instant n, and a starting position of the resource selection window is n+T1, then the starting position of the additional sensing window may be less than or equal to n+T1−P_max. In the example shown in FIG. 14, P_max is 70 ms, then the starting position of the additional sensing window is equal to n+T1−70 ms. For example, the second determining unit 102 may determine the maximum period based on service periods that the resource pool for the sidelink communications can support.

In addition, the starting position of the additional sensing window may further depend on requirements of aperiodic traffics for channel sensing. For example, in the case of considering the aperiodic services, the starting position of the additional sensing window should be less than or equal to n+T1−32 (where 32 represents the previously mentioned 32 time slots). Thus, the starting position of the additional sensing window should be set to be less than or equal to min(n+T1−P_max, n+T1−32).

It should be understood that in a case that a starting position of an additional sensing window overlaps with a partial sensing windows on a left side of the additional sensing window, it is unnecessary to discuss the starting position of the additional sensing window.

With the electronic apparatus 100 according to the embodiment, an additional sensing window is set before the starting position of the resource selection window, avoiding collisions with services with various periods, and thereby improving communication reliability.

Fourth Embodiment

Figure 15:
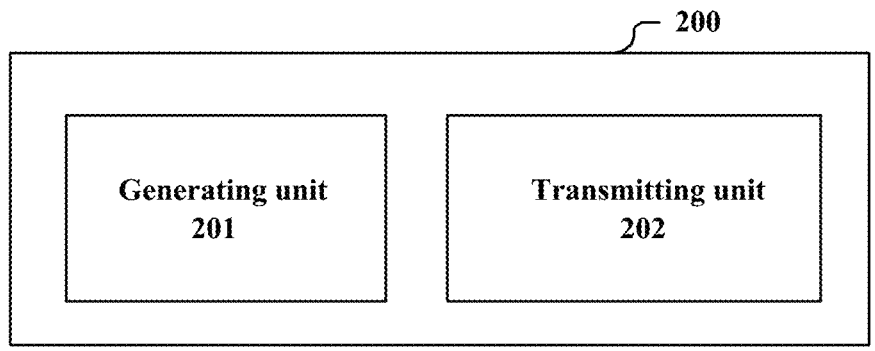
FIG. 15 shows a functional block diagram of an electronic apparatus for wireless communications according to another embodiment of the present disclosure.

FIG. 15 shows a functional block diagram of an electronic apparatus 200 according to another embodiment of the present disclosure. As shown in FIG. 15, the electronic apparatus 200 includes a generating unit 201 and a transmitting unit 202. The generating unit 201 is configured to generate a resource pool configuration signaling for configuring a resource pool for sidelink communications. The resource pool configuration signaling includes: indication information indicating whether the resource pool allows a UE not performing channel sensing to perform data transmission, or indication information indicating which part of the resource pool allows a UE not performing channel sensing to perform data transmission. The transmitting unit 202 is configured to transmit the resource pool configuration signaling to the UE.

The generating unit 201 and the transmitting unit 202 may be implemented by one or more processing circuitry, and the processing circuitry, for example, may be implemented as a chip. Moreover, it should be understood that, the functional units in the apparatus shown in FIG. 15 are only logic modules which are divided based on the specific functions thereof, and are not intended to limit the implementations.

The electronic apparatus 200, for example, may be arranged on a base station side or may be communicatively connected to a base station. It should be further noted that the electronic apparatus 200 may be implemented at a chip level or a device level. For example, the electronic apparatus 200 may function as a base station itself, and may include an external device such as a memory and a transceiver (not shown in FIG. 15). The memory may store programs and related data information for implementing various functions by the base station. The transceiver may include one or more communication interfaces to support communication with different devices (for example, other base stations, UE or the like). The implementation of the transceiver is not limited herein.

For example, in the part of the resource pool that allows a UE not performing channel sensing to perform data transmission, a service with a high priority level cannot occupy time-frequency resources of a service with a low priority level (that is, a UE having high priority level data packets cannot occupy time-frequency resources selected by another UE having low priority level packets), thereby reducing collisions. Detail descriptions have been provided in the first embodiment with reference to FIG. 9, and are not repeated herein.

For example, the transmitting unit 202 may be configured to transmit the resource pool configuration signaling by broadcasting. Thus, the UE may know whether the resource pool allows the UE not performing channel sensing to perform data transmission, and may know which part of the resource pool allows the UE not performing channel sensing to perform data transmission.

In conclusion, the electronic apparatus 200 according to the embodiment transmits the resource pool configuration signaling to the UE to indicate which part of the resource pool allows the UE not performing channel sensing to perform data transmission, thereby reducing collisions.

Fifth Embodiment

Figure 16:
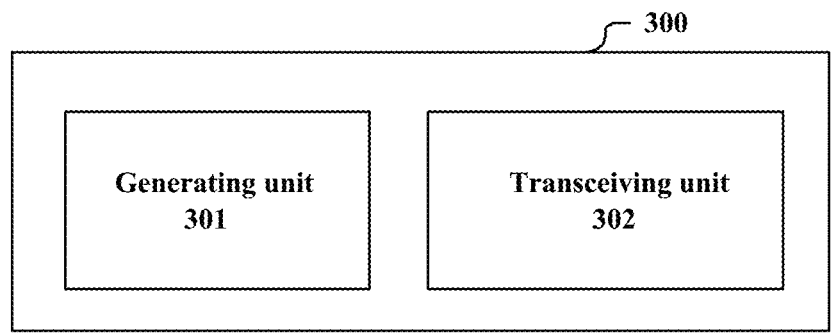
FIG. 16 shows a functional block diagram of an electronic apparatus for wireless communications according to another embodiment of the present disclosure.

FIG. 16 shows a functional block diagram of an electronic apparatus 300 according to another embodiment of the present disclosure. As shown in FIG. 16, the electronic apparatus 300 includes a generating unit 301 and a transceiving unit 302. The generating unit 301 is configured to randomly select time-frequency resources in the resource pool for side link communications and generate SCI. The SCI includes one of the following: indication information indicating that UE does not perform channel sensing on corresponding time-frequency resources; and priority level information of a data packet, wherein the data packet is adjusted to have the highest priority level. The transceiving unit 302 is configured to transmit the SCI to other UE.

The generating unit 301 and the transceiving unit 302 may be implemented by one or more processing circuitry, and the processing circuitry, for example, may be implemented as a chip. Moreover, it should be understood that, functional units in the apparatus shown in FIG. 16 are only logic modules which are divided based on the specific functions thereof, and are not intended to limit the implementations.

The electronic apparatus 300, for example, may be arranged on a UE side or may be communicatively connected to a UE. It should be further noted that the electronic apparatus 300 may be implemented at a chip level or a device level. For example, the electronic apparatus 300 may function as a UE itself, and may include an external device such as a memory and a transceiver (not shown in FIG. 16). The memory may store programs and related data information for implementing various functions by the UE. The transceiver may include one or more communication interfaces to support communication with different devices (for example, a base station, other UEs or the like). The implementation of the transceiver is not limited herein.

As described in the first embodiment, in the case of randomly selecting time-frequency resources, if a collision occurs, it may be determined which UE may use the time-frequency resources based on the priority levels of data packets from different UEs. However, if a UE that randomly selects time-frequency resources, such as the UE1 in FIG. 7, does not perform channel sensing after resource selection, the UE cannot sense the occupation of the selected resources by other UE with the higher priority level data, such as the UE2 in FIG. 7, and the UE still performs transmission with the selected resources, resulting in collisions.

Therefore, in an example, SCI is configured with which the UE may notify other UEs of the fact that the UE does not perform channel sensing on corresponding time-frequency resources, so that other UEs do not occupy the time-frequency resources, thereby avoiding collisions. Specifically, other UEs determine that the corresponding time-frequency resources are occupied by the UE that does not perform channel sensing based on the indication information in the SCI, and the other UEs do not occupy the time-frequency resources. The rule to determine which UE is to use the time-frequency resources based on the priority level of the data packet does not apply at this time.

For example, the generating unit 301 may randomly select the time-frequency resources in a particular part of the resource pool. The particular part of the resource pool allows the UE not performing channel sensing to perform data transmission. An example of the resource pool, for example, is shown in FIG. 9. That is, in a case of performing data transmission without performing channel sensing, the UE may use a particular part of the resource pool. The particular part does not allow a service with a high priority level to occupy time-frequency resources of a service with a low priority level, thereby avoiding the above collision problem. Alternatively, it may be determined whether a corresponding UE does not perform channel sensing based on the indication information in the SCI, and corresponding time-frequency resources are not to be occupied in a case of determining that the corresponding UE does not perform channel sensing.

In addition, the transceiving unit 302 may be further configured to receive a resource pool configuration signaling from a base station. The resource pool configuration signaling includes: indication information indicating whether the resource pool allows the UE not performing channel sensing to perform data transmission, or indication information indicating which part of the resource pool allows the UE not performing channel sensing to perform data transmission. The generating unit 301 may determine the particular part of the resource pool that allows the UE not performing channel sensing to perform data transmission based on the resource pool configuration signaling. The particular part, for example, does not allow a service with a high priority level to occupy time-frequency resources of a service with a low priority level.

In another example, a data packet transmitted through the corresponding time-frequency resources may be adjusted to have the highest priority level in the SCI, so that other UEs cannot occupy the time-frequency resources. It should be noted that the adjusted priority level of the data packet is only notified to other UEs, and it is required for the UE to maintain the real priority level of the data packet. For example, in a case that a conflict occurs between sidelink communications and uplink transmission, it is determined which data packet is to be transmitted firstly by comparing the real priority level with a priority of an uplink data packet.

In summary, with the electronic apparatus 300 according to the embodiment, the collisions between the UE that does not perform channel sensing and other UEs due to not performing channel sensing can be avoided, thereby improving communication reliability.

Sixth Embodiment

In the above description of embodiments of the electronic apparatuses for wireless communications, it is apparent that some processing and methods are further disclosed. In the following, a summary of the methods are described without repeating details that are described above. However, it should be noted that although the methods are disclosed when describing the electronic apparatuses for wireless communications, the methods are unnecessary to adopt those components or to be performed by those components described above. For example, implementations of the electronic apparatuses for wireless communications may be partially or completely implemented by hardware and/or firmware. Methods for wireless communications to be discussed blow may be completely implemented by computer executable programs, although these methods may be implemented by the hardware and/or firmware for implementing the electronic apparatuses for wireless communications.

Figure 17:
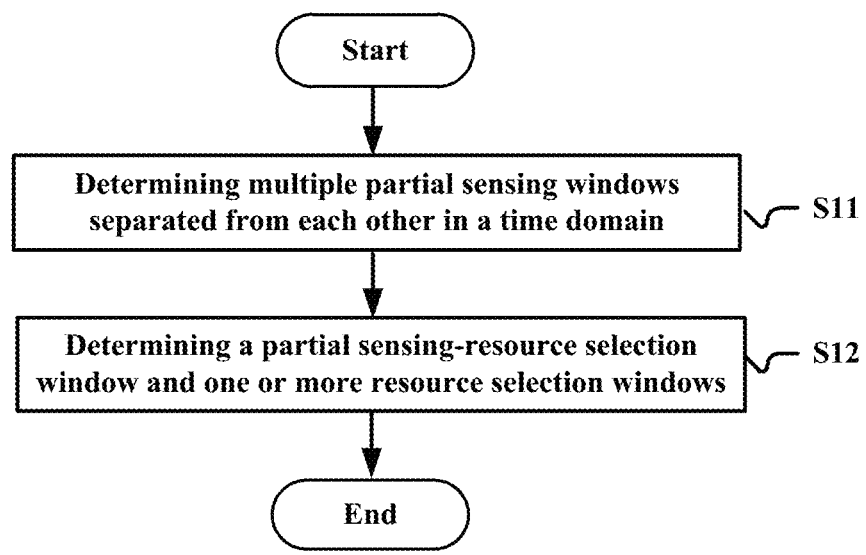
FIG. 17 shows a flowchart of a method for wireless communications according to an embodiment of the present application.

FIG. 17 shows a flowchart of a method for wireless communications according to an embodiment of the present disclosure. The method includes: determining a plurality of partial sensing windows separated from each other in a time domain (S11), wherein in the plurality of partial sensing windows, a user equipment performing sidelink communications senses at least a part of time-frequency resources in a resource pool for the sidelink communications; and determining a partial sensing-resource selection window and one or more resource selection windows (S12), wherein the partial sensing-resource selection window is a time-frequency window defined by a plurality of previous partial sensing windows after triggering resource selection, an occupancy state of time-frequency resources in the partial sensing-resource selection window is known to the user equipment, and the user equipment selects time-frequency resources in the one or more resource selection windows to perform the sidelink communications. The partial sensing-resource selection window covers the one or more resource selection windows. The method, for example, may be performed at the UE side.

The partial sensing-resource selection window may have a same size in the time domain as the partial sensing window. For example, an upper limit of the time domain size of the partial sensing-resource selection window is equal to a maximum allowable transmission delay PDB of a data packet. In addition, the partial sensing window, the partial sensing-resource selection window and the resource selection window may be discontinuous in the time domain.

In a case that the UE performs HARQ transmission, the lower limit of the time domain size of the partial sensing-resource selection window may be determined based on a maximum number of times of transmission of a single data packet in the HARQ transmission. For example, the lower limit of the time domain size of the partial sensing-resource selection window may be determined as a product of a difference obtained by subtracting 1 from the maximum number of times of transmission and a time interval between two transmissions of the single data packet. The time interval between the two transmissions is a maximum time interval, a minimum time interval or an average time interval between each two transmissions in the HARQ transmission. Alternatively, the lower limit of the time domain size of the partial sensing-resource selection window may be determined as a total time domain size of resource selection windows crossed by a HARQ transmission having the maximum number of times of transmission.

In an example, the method further includes: in a case of sensing that the selected time-frequency resources are occupied, activating a resource reselection window to perform resource reselection, and transmitting data only on time-frequency resources corresponding to an overlapping part of the resource reselection window and the partial sensing-resource selection window; and/or in a case of determining to perform retransmission and thus it is required to activate a new resource selection window to perform the retransmission in HARQ transmission, transmitting data only on time-frequency resources corresponding to an overlapping part of the new resource selection window and the partial sensing-resource selection window.

In a case that no time-frequency resources suitable for transmitting the data can be selected on the time-frequency resources corresponding to the overlapping part of the resource reselection window and the partial sensing-resource selection window since the time-frequency resources corresponding to the overlapping part of the resource reselection window and the partial sensing-resource selection window may be few, transmission of a block to be transmitted is terminated. Alternatively, transmission may be performed on time-frequency resources within a coverage range of the resource reselection window and outside of a coverage range of the partial sensing-resource selection window. In a case of selecting time-frequency resources within the coverage range of the resource reselection window and outside of the coverage range of the partial sensing-resource selection window to perform data transmission, the time-frequency resources are selected in one of the following manners: performing random selection, performing selection based on a resource sensing result in the partial sensing-resource selection window or a resource sensing result in the resource reselection window or in the resource selection window, and a combination thereof. The resource sensing result in the resource reselection window may be a temporary resource sensing result in the resource reselection window. The above description is also applicable to the resource selection window, and is not repeated herein.

In a case that the UE performs sidelink transmission on randomly selected time-frequency resources and does not perform channel sensing, it is possible to include one of the following information in the SCI: indication information indicating that the user equipment does not perform channel sensing on the time-frequency resources; and priority level information of a data packet, wherein the data packet is adjusted to have the highest priority level.

Accordingly, the method may further include: receiving SCI from another UE. The SCI includes one of the following: indication information indicating that the other user equipment does not perform channel sensing on corresponding time-frequency resources; and data packet priority level information indicating that data packets transmitted by the other UE using the corresponding time-frequency resources have the highest priority level. The UE is caused not to occupy the corresponding time-frequency resources to perform data transmission.

On the other hand, the method may further include: receiving a resource pool configuration signaling from a base station. The resource pool configuration signaling indicates whether the resource pool allows the UE that does not perform channel sensing to perform data transmission, or configures a part of the resource pool to allow the user equipment not performing channel sensing to perform data transmission. It is possible to randomly select time-frequency resources in this part of the resource pool to perform sidelink transmission without performing channel sensing. For example, a service with a high priority level is not allowed to occupy time-frequency resources of a service with a low priority level in this part of the resource pool.

In another example, the method may further include: performing dynamic adjustment on a frequency domain range of each of the partial sensing windows. For example, an adjustment instruction may be received from a base station, and then dynamic adjustment is performed based on the adjustment instruction. Alternatively, the dynamic adjustment may be performed based on a measurement result from the UE. The measurement result may include one or more of: a channel busy ratio (CBR), and feedback information in HARQ transmission. For example, in a case that the CBR increases and/or the number of times of feedback of NACK or the number of times of timeout without feedback increases in the HARQ transmission, the frequency domain range of each of the partial sensing windows is increased.

In another example, the method may further include: setting an additional sensing window before a starting position of the resource selection window. For example, a starting position of the additional sensing window is dependent on a maximum period of each of periodic services which cannot be sensed in the partial sensing windows. The maximum period may be determined based on service periods that the resource pool for the sidelink communications can support. In addition, the starting position of the additional sensing window may be further dependent on requirements of aperiodic services for channel sensing.

Figure 18:
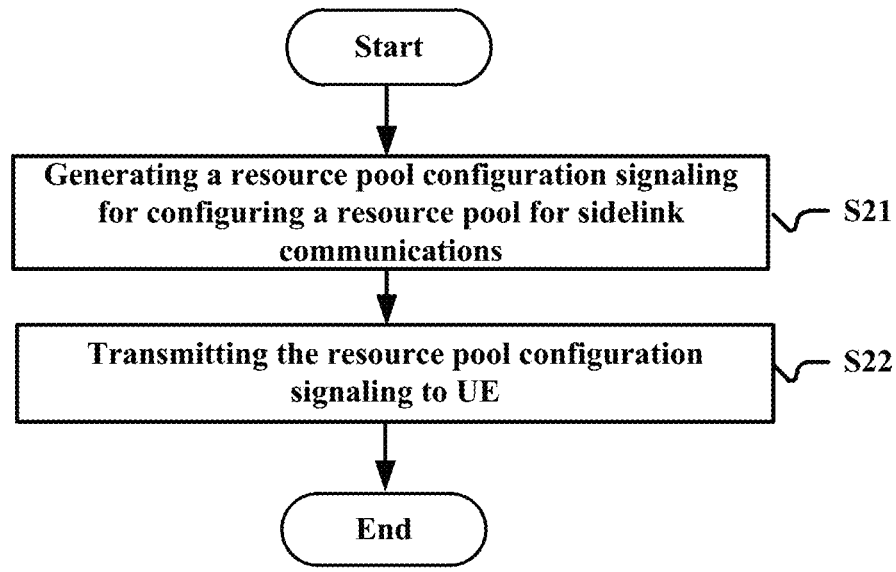
FIG. 18 shows a flowchart of a method for wireless communications according to another embodiment of the present application.

FIG. 18 shows a flowchart of a method for wireless communications according to another embodiment of the present disclosure. The method includes: generating a resource pool configuration signaling for configuring a resource pool for sidelink communications (S21), where the resource pool configuration signaling includes: indication information indicating whether the resource pool allows a UE not performing channel sensing to perform data transmission, or indication information indicating which part of the resource pool allows a UE not performing channel sensing to perform data transmission; and transmitting the resource pool configuration signaling to the UE (S22). The method, for example, may be performed at the base station side.

In the above step S22, the resource pool configuration signaling may be transmitted by broadcasting. For example, a service with a high priority level is not allowed to occupy time-frequency resources of a service with a low priority level.

Figure 19:
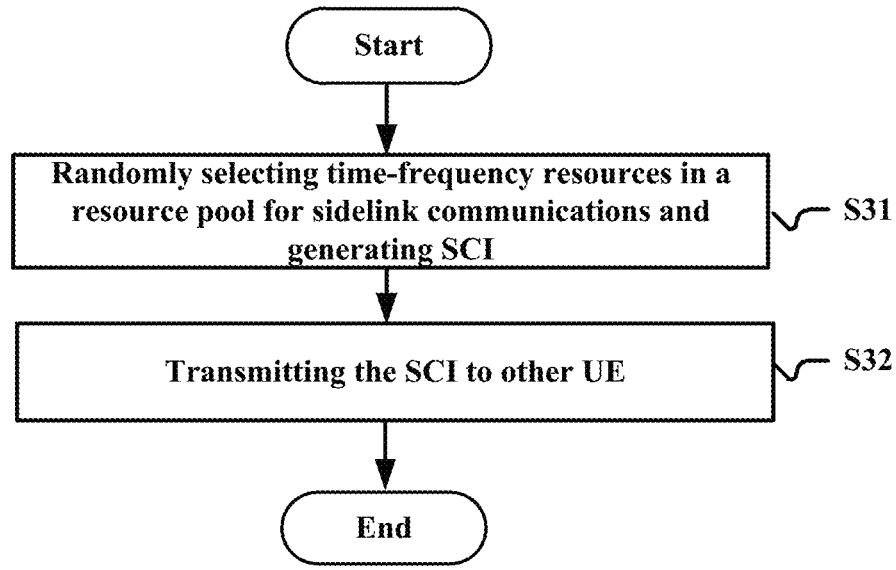
FIG. 19 shows a flowchart of a method for wireless communications according to another embodiment of the present application.

FIG. 19 shows a flowchart of a method for wireless communications according to another embodiment of the present disclosure. The method includes: randomly selecting time-frequency resources in a resource pool for sidelink communications and generating SCI (S31), where the SCI includes one of the following: indication information indicating that a user equipment does not perform channel sensing on corresponding time-frequency resources; priority level information of a data packet, wherein the data packet is adjusted to have the highest priority level; and transmitting the SCI to other UE (S32). The method, for example, may be performed at the UE side.

In the above step S31, time-frequency resources may be randomly selected in a particular part of the resource pool, and the particular part of the resource pool allows the user equipment that does not perform channel sensing to perform data transmission. For example, the particular part of the resource pool does not allow a service having a high priority level to occupy time-frequency resources of a service having a low priority level.

Although not shown in the Figure, the method may further include: receiving a resource pool configuration signaling from a base station. The resource pool configuration signaling, for example, includes: indication information indicating whether the resource pool allows the user equipment that does not perform channel sensing to perform data transmission, or indication information indicating which part of the resource pool allows the user equipment that does not perform channel sensing to perform data transmission. For example, in this part of the resource pool, a service having a high priority level is not allowed to occupy time-frequency resources of a service having a low priority level. For example, the resource pool configuration signaling may be received through a broadcast signaling.

The above methods respectively correspond to the electronic apparatus 100 described in the first embodiment to the third embodiment, the electronic apparatus 200 described in the fourth embodiment, and the electronic apparatus 300 described in the fifth embodiment. As for details, one may refer to the descriptions in the above corresponding embodiments, and are not repeated herein. It should be noted that the above methods may be performed in combination or separately.

The technology according to the present disclosure may be applicable to various products.

The electronic apparatus 200 may be implemented as various base stations. The base stations may be implemented as any type of evolved node B (eNB) or gNB (5G base station). The eNB includes a macro eNB and a small eNB, for example. The small eNB may be an eNB such as a pico eNB, a micro eNB and a home (femto) eNB that covers a cell smaller than a macro cell. The situation is similar to the gNB. Alternatively, the base station may also be implemented as a base station of any other type, such as a NodeB and a base transceiver station (BTS). The base station may include a main body (that is also referred to as a base station device) configured to control wireless communications, and one or more remote radio heads (RRH) arranged in a different place from the main body. In addition, various types of user equipment each may operate as the base station by performing functions of the base station temporarily or semi-permanently.

For example, the electronic apparatus 100 and the electronic apparatus 300 may be implemented as various user equipments. The user equipment may be implemented as a mobile terminal (such as a smartphone, a tablet personal computer (PC), a notebook PC, a portable game terminal, a portable/dongle type mobile router, and a digital camera), or an in-vehicle terminal (such as a car navigation device). The user equipment may also be implemented as a terminal (that is also referred to as a machine type communication (MTC) terminal) that performs machine-to-machine (M2M) communication. Furthermore, the user equipment may be a wireless communication module (such as an integrated circuit module including a single die) mounted on each of the terminals.

Application Examples Regarding a Base Station

First Application Example

Figure 20:
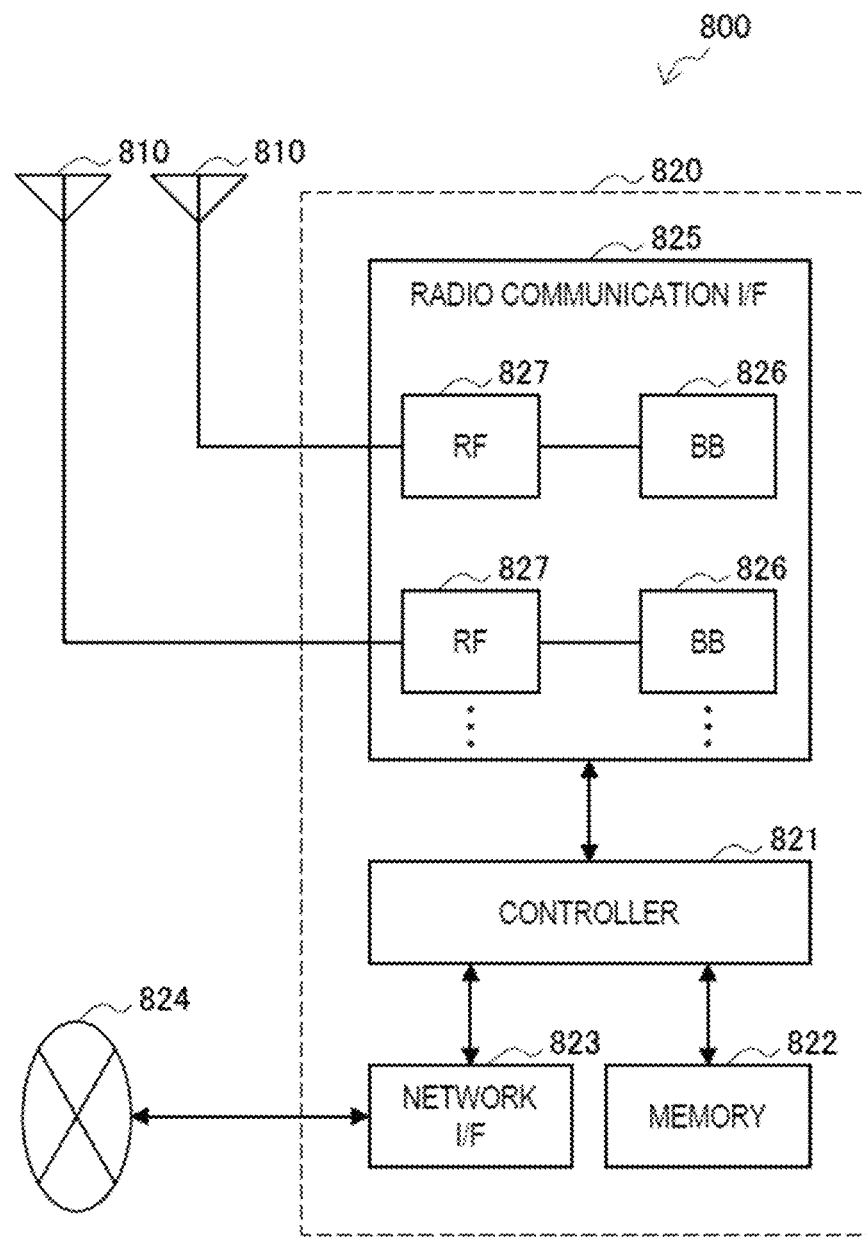
FIG. 20 is a block diagram showing a first example of an exemplary configuration of an eNB or gNB to which the technology of the present disclosure may be applied.

FIG. 20 is a block diagram showing a first example of an exemplary configuration of an eNB or gNB to which the technology according to the present disclosure may be applied. It should be noted that the following description is given by taking the eNB as an example, which is also applicable to the gNB. An eNB 800 includes one or more antennas 810 and a base station apparatus 820. The base station apparatus 820 and each of the antennas 810 may be connected to each other via a radio frequency (RF) cable.

Each of the antennas 810 includes a single or multiple antennal elements (such as multiple antenna elements included in a multiple-input multiple-output (MIMO) antenna), and is used for the base station apparatus 820 to transmit and receive wireless signals. As shown in FIG. 20, the eNB 800 may include the multiple antennas 810. For example, the multiple antennas 810 may be compatible with multiple frequency bands used by the eNB 800. Although FIG. 20 shows the example in which the eNB 800 includes the multiple antennas 810, the eNB 800 may include a single antenna 810.

The base station apparatus 820 includes a controller 821, a memory 822, a network interface 823, and a radio communication interface 825.

The controller 821 may be, for example, a CPU or a DSP, and operates various functions of a higher layer of the base station apparatus 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as resource control, radio bearer control, mobility management, admission control and scheduling. The control may be performed in corporation with an eNB or a core network node in the vicinity. The memory 822 includes a RAM and a ROM, and stores a program executed by the controller 821 and various types of control data (such as a terminal list, transmission power data and scheduling data).

The network interface 823 is a communication interface for connecting the base station apparatus 820 to a core network 824. The controller 821 may communicate with a core network node or another eNB via the network interface 823. In this case, the eNB 800, and the core network node or another eNB may be connected to each other via a logic interface (such as an S1 interface and an X2 interface). The network interface 823 may also be a wired communication interface or a wireless communication interface for wireless backhaul. In a case that the network interface 823 is a wireless communication interface, the network interface 823 may use a higher frequency band for wireless communication than that used by the radio communication interface 825.

The radio communication interface 825 supports any cellular communication scheme (such as Long Term Evolution (LTE) and LTE-advanced), and provides wireless connection to a terminal located in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and perform various types of signal processing of layers (such as L1, Media Access Control (MAC), Radio Link Control (RLC), and a Packet Data Convergence Protocol (PDCP)). The BB processor 826 may have a part or all of the above-described logical functions, to replace the controller 821. The BB processor 826 may be a memory storing communication control programs, or a module including a processor and a related circuit configured to execute the programs. Updating the program may allow the functions of the BB processor 826 to be changed. The module may be a card or a blade inserted into a slot of the base station apparatus 820. Alternatively, the module may be a chip mounted on the card or the blade. Meanwhile, the RF circuit 827 may include, for example, a mixer, a filter, and an amplifier, and transmits and receives wireless signals via the antenna 810.

As shown in FIG. 20, the radio communication interface 825 may include multiple BB processors 826. For example, the multiple BB processors 826 may be compatible with multiple frequency bands used by the eNB 800. The radio communication interface 825 may include multiple RF circuits 827, as shown in FIG. 20. For example, the multiple RF circuits 827 may be compatible with multiple antenna elements. Although FIG. 20 shows the example in which the radio communication interface 825 includes multiple BB processors 826 and multiple RF circuits 827, the radio communication interface 825 may include a single BB processor 826 and a single RF circuit 827.

In the eNB 800 shown in FIG. 20, the transmitting unit 202 and the transceiver of the electronic apparatus 200 may be implemented by the radio communication interface 825. At least a part of the functions may also be implemented by the controller 821. For example, the controller 821 may perform the functions of the generating unit 201 and the transmitting unit 202 to configure a resource pool for sidelink communications to reduce collisions between the UE that does not perform channel sensing and other UEs due to lack of channel sensing.

Second Application Example

Figure 21:
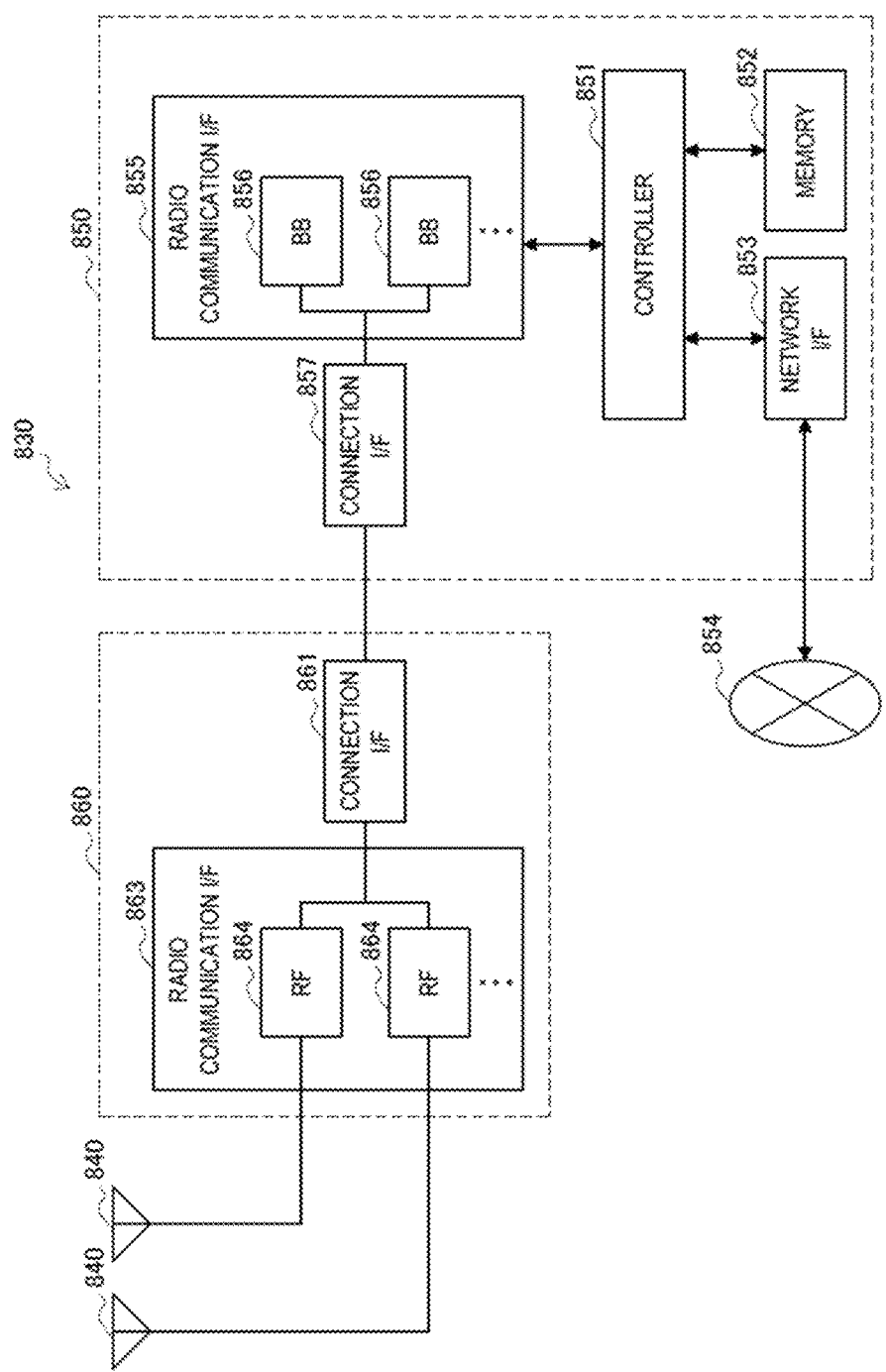
FIG. 21 is a block diagram showing a second example of an exemplary configuration of an eNB or gNB to which the technology of the present disclosure may be applied.

FIG. 21 is a block diagram showing a second example of a schematic configuration of an eNB or gNB to which the technology of the present disclosure can be applied. It should be noted that the following description is given by taking the eNB as an example, which is also applied to the gNB. An eNB 830 includes one or more antennas 840, a base station apparatus 850, and an RRH 860. The RRH 860 and each of the antennas 840 may be connected to each other via an RF cable. The base station apparatus 850 and the RRH 860 may be connected to each other via a high speed line such as an optical fiber cable.

Each of the antennas 840 includes a single or multiple antennal elements (such as multiple antenna elements included in an MIMO antenna), and is used for the RRH 860 to transmit and receive wireless signals. As shown in FIG. 21, the eNB 830 may include multiple antennas 840. For example, the multiple antennas 840 may be compatible with multiple frequency bands used by the eNB 830. Although FIG. 21 shows the example in which the eNB 830 includes multiple antennas 840, the eNB 830 may include a single antenna 840.

The base station apparatus 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 20.

The radio communication interface 855 supports any cellular communication scheme (such as LTE and LTE-advanced), and provides wireless communication to a terminal located in a sector corresponding to the RRH 860 via the RRH 860 and the antenna 840. The radio communication interface 855 may typically include, for example, a BB processor 856. The BB processor 856 is the same as the BB processor 826 described with reference to FIG. 20, except that the BB processor 856 is connected to an RF circuit 864 of the RRH 860 via the connection interface 857. As show in FIG. 21, the radio communication interface 855 may include multiple BB processors 856. For example, the multiple BB processors 856 may be compatible with multiple frequency bands used by the eNB 830. Although FIG. 21 shows the example in which the radio communication interface 855 includes multiple BB processors 856, the radio communication interface 855 may include a single BB processor 856.

The connection interface 857 is an interface for connecting the base station apparatus 850 (radio communication interface 855) to the RRH 860. The connection interface 857 may also be a communication module for communication in the above-described high speed line that connects the base station apparatus 850 (radio communication interface 855) to the RRH 860.

The RRH 860 includes a connection interface 861 and a radio communication interface 863.

The connection interface 861 is an interface for connecting the RRH 860 (radio communication interface 863) to the base station apparatus 850. The connection interface 861 may also be a communication module for communication in the above-described high speed line.

The radio communication interface 863 transmits and receives wireless signals via the antenna 840. The radio communication interface 863 may typically include, for example, an RF circuit 864. The RF circuit 864 may include, for example, a mixer, a filter and an amplifier, and transmits and receives wireless signals via the antenna 840. The radio communication interface 863 may include multiple RF circuits 864, as shown in FIG. 21. For example, the multiple RF circuits 864 may support multiple antenna elements. Although FIG. 21 shows the example in which the radio communication interface 863 includes multiple RF circuits 864, the radio communication interface 863 may include a single RF circuit 864.

In the eNB 830 shown in FIG. 21, the transmitting unit 202 and the transceiver of the electronic apparatus 200 may be implemented by the radio communication interface 855 and/or the radio communication interface 863. At least a part of the functions may also be implemented by the controller 851. For example, the controller 851 may perform the functions of the generating unit 201 and the transmitting unit 202 to configure a resource pool for sidelink communications to reduce collisions between the UE that does not perform channel sensing and other UEs due to lack of channel sensing.

Application Example Regarding User Equipment

First Application Example

Figure 22:
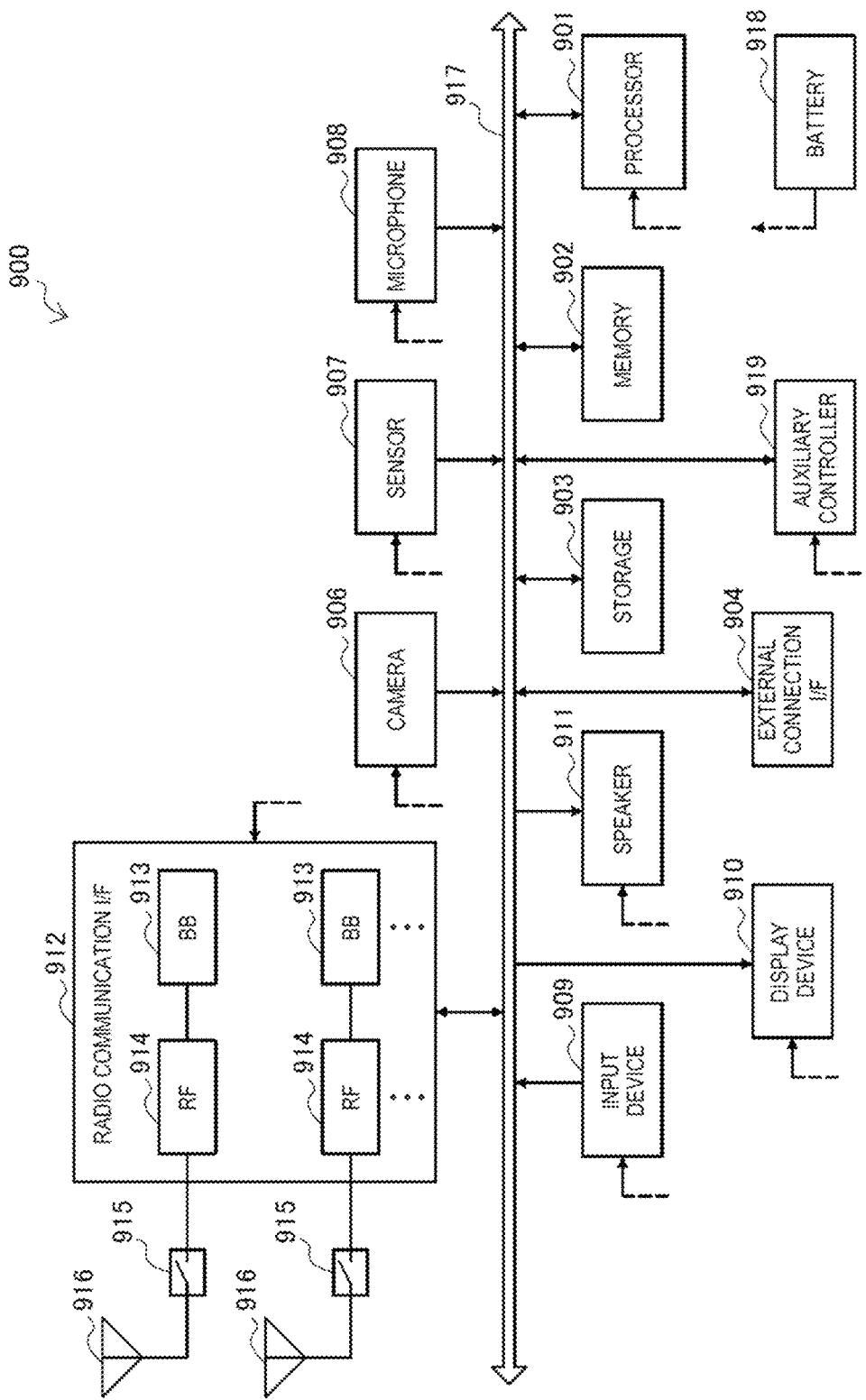
FIG. 22 is a block diagram showing an example of an exemplary configuration of a smartphone to which the technology according to the present disclosure may be applied.

FIG. 22 is a block diagram showing an exemplary configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes a RAM and a ROM, and stores a program executed by the processor 901 and data. The storage 903 may include a storage medium such as a semiconductor memory and a hard disk. The external connection interface 904 is an interface for connecting an external device (such as a memory card and a universal serial bus (USB) device) to the smartphone 900.

The camera 906 includes an image sensor (such as a charge coupled device (CCD) and a complementary metal oxide semiconductor (CMOS)), and generates a captured image. The sensor 907 may include a group of sensors, such as a measurement sensor, a gyro sensor, a geomagnetism sensor, and an acceleration sensor. The microphone 908 converts sounds inputted to the smartphone 900 to audio signals. The input device 909 includes, for example, a touch sensor configured to detect touch onto a screen of the display device 910, a keypad, a keyboard, a button, or a switch, and receives an operation or information inputted from a user. The display device 910 includes a screen (such as a liquid crystal display (LCD) and an organic light-emitting diode (OLED) display), and displays an output image of the smartphone 900. The speaker 911 converts audio signals outputted from the smartphone 900 to sounds.

The radio communication interface 912 supports any cellular communication scheme (such as LTE and LTE-advanced), and performs wireless communications. The radio communication interface 912 may include, for example, a BB processor 913 and an RF circuit 914. The BB processor 913 may perform, for example, encoding/decoding, modulating/demodulating, and multiplexing/de-multiplexing, and perform various types of signal processing for wireless communication. The RF circuit 914 may include, for example, a mixer, a filter and an amplifier, and transmits and receives wireless signals via the antenna 916. It should be noted that although FIG. 22 shows a case that one RF link is connected to one antenna, which is only illustrative, and a situation where one RF link is connected to multiple antennas through multiple phase shifters is also possible. The radio communication interface 912 may be a chip module having the BB processor 913 and the RF circuit 914 integrated thereon. The radio communication interface 912 may include multiple BB processors 913 and multiple RF circuits 914, as shown in FIG. 22. Although FIG. 22 shows the example in which the radio communication interface 912 includes multiple BB processors 913 and multiple RF circuits 914, the radio communication interface 912 may include a single BB processor 913 or a single RF circuit 914.

Furthermore, in addition to a cellular communication scheme, the radio communication interface 912 may support another type of wireless communication scheme such as a short-distance wireless communication scheme, a near field communication scheme, and a wireless local area network (LAN) scheme. In this case, the radio communication interface 912 may include the BB processor 913 and the RF circuit 914 for each wireless communication scheme.

Each of the antenna switches 915 switches connection destinations of the antennas 916 among multiple circuits (such as circuits for different wireless communication schemes) included in the radio communication interface 912.

Each of the antennas 916 includes a single or multiple antenna elements (such as multiple antenna elements included in an MIMO antenna) and is used for the radio communication interface 912 to transmit and receive wireless signals. The smartphone 900 may include the multiple antennas 916, as shown in FIG. 22. Although FIG. 22 shows the example in which the smartphone 900 includes multiple antennas 916, the smartphone 900 may include a single antenna 916.

Furthermore, the smartphone 900 may include the antenna 916 for each wireless communication scheme. In this case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smartphone 900 shown in FIG. 22 via feeder lines, which are partially shown as dashed lines in FIG. 22. The auxiliary controller 919 operates a minimum necessary function of the smartphone 900, for example, in a sleep mode.

In the smartphone 900 shown in FIG. 22, the transceiving unit 103, the transceiver and the like of the electronic apparatus 100 may be implemented by the radio communication interface 912, and the transceiving unit 302, the transceiver and the like of the electronic apparatus 300 may be implemented by the radio communication interface 912. At least part of the functions may also be implemented by the processor 901 or the auxiliary controller 919. For example, the processor 901 or the auxiliary controller 919 may perform the functions of the first determining unit 101, the second determining unit 102, the transceiving unit 103, and the adjusting unit 104 to cause the partial sensing-resource selection window to cover the resource selection windows so as to perform resource selection among time-frequency resources with a known occupancy state to reduce the probability of resource collisions in the energy saving mode and improve the reliability of the sidelink communications; and to dynamically adjust the frequency domain range of the partial sensing window to improve energy saving efficiency. The processor 901 or the auxiliary controller 919 may perform the functions of the generating unit 301 and the transceiving unit 302 to reduce collisions between the UE that does not perform channel sensing and other UEs due to lack of channel sensing.

Second Application Example

Figure 23:
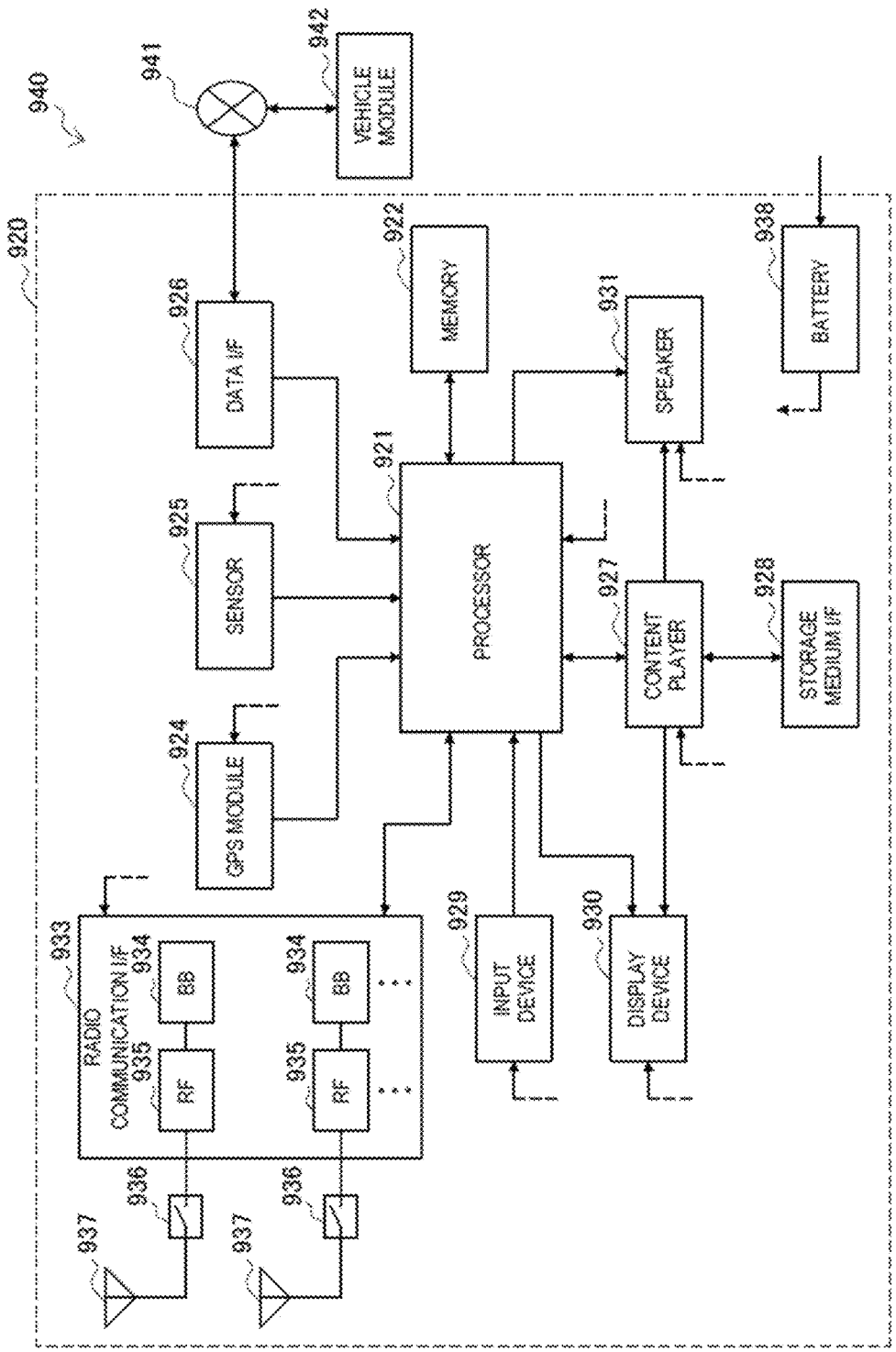
FIG. 23 is a block diagram showing an example of an exemplary configuration of a car navigation apparatus to which the technology according to the present disclosure may be applied.

FIG. 23 is a block diagram showing an example of a schematic configuration of a car navigation apparatus 920 to which the technology according to the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example a CPU or a SoC, and controls a navigation function and additional function of the car navigation apparatus 920. The memory 922 includes RAM and ROM, and stores a program executed by the processor 921, and data.

The GPS module 924 determines a position (such as latitude, longitude and altitude) of the car navigation apparatus 920 by using GPS signals received from a GPS satellite. The sensor 925 may include a group of sensors such as a gyro sensor, a geomagnetic sensor and an air pressure sensor. The data interface 926 is connected to, for example, an in-vehicle network 941 via a terminal that is not shown, and acquires data (such as vehicle speed data) generated by the vehicle.

The content player 927 reproduces content stored in a storage medium (such as a CD and DVD) that is inserted into the storage medium interface 928. The input device 929 includes, for example, a touch sensor configured to detect touch onto a screen of the display device 930, a button, or a switch, and receives an operation or information inputted from a user. The display device 930 includes a screen such as an LCD or OLED display, and displays an image of the navigation function or reproduced content. The speaker 931 outputs a sound for the navigation function or the reproduced content.

The radio communication interface 933 supports any cellular communication scheme (such as LTE and LTE-Advanced), and performs wireless communication. The radio communication interface 933 may typically include, for example, a BB processor 934 and an RF circuit 935. The BB processor 934 may perform, for example, encoding/decoding, modulating/demodulating and multiplexing/demultiplexing, and perform various types of signal processing for wireless communication. The RF circuit 935 may include, for example, a mixer, a filter and an amplifier, and transmits and receives wireless signals via the antenna 937. The radio communication interface 933 may also be a chip module having the BB processor 934 and the RF circuit 935 integrated thereon. The radio communication interface 933 may include multiple BB processors 934 and multiple RF circuits 935, as shown in FIG. 23. Although FIG. 23 shows the example in which the radio communication interface 933 includes multiple BB processors 934 and multiple RF circuits 935, the radio communication interface 933 may include a single BB processor 934 and a single RF circuit 935.

Furthermore, in addition to a cellular communication scheme, the radio communication interface 933 may support another type of wireless communication scheme such as a short-distance wireless communication scheme, a near field communication scheme, and a wireless LAN scheme. In this case, the radio communication interface 933 may include the BB processor 934 and the RF circuit 935 for each wireless communication scheme.

Each of the antenna switches 936 switches connection destinations of the antennas 937 among multiple circuits (such as circuits for different wireless communication schemes) included in the radio communication interface 933.

Each of the antennas 937 includes a single or multiple antenna elements (such as multiple antenna elements included in an MIMO antenna), and is used for the radio communication interface 933 to transmit and receive wireless signals. As shown in FIG. 23, the car navigation apparatus 920 may include multiple antennas 937. Although FIG. 23 shows the example in which the car navigation apparatus 920 includes multiple antennas 937, the car navigation apparatus 920 may include a single antenna 937.

Furthermore, the car navigation apparatus 920 may include the antenna 937 for each wireless communication scheme. In this case, the antenna switches 936 may be omitted from the configuration of the car navigation apparatus 920.

The battery 938 supplies power to the blocks of the car navigation apparatus 920 shown in FIG. 23 via feeder lines that are partially shown as dash lines in FIG. 23. The battery 938 accumulates power supplied from the vehicle.

In the car navigation apparatus 920 shown in FIG. 23, the transceiving unit 103, the transceiver and the like of the electronic apparatus 100 may be implemented by the radio communication interface 933, and the transceiving unit 302, the transceiver and the like of the electronic apparatus 300 may be implemented by the radio communication interface 933. At least part of the functions may also be implemented by the processor 921. For example, the processor 921 may perform the functions of the first determining unit 101, the second determining unit 102, the transceiving unit 103, and the adjusting unit 104 to cause the partial sensing-resource selection window to cover the resource selection windows so as to perform resource selection among time-frequency resources with a known occupancy state to reduce the probability of resource collisions in the energy saving mode and improve the reliability of the sidelink communications; and to dynamically adjust the frequency domain range of the partial sensing window to improve energy saving efficiency. The processor 901 or the auxiliary controller 919 may perform the functions of the generating unit 301 and the transceiving unit 302 to reduce collisions between the UE that does not perform channel sensing and other UEs due to lack of channel sensing.

The technology according to the present disclosure may also be implemented as an in-vehicle system (or a vehicle) 940 including one or more blocks of the car navigation device 920, the in-vehicle network 941, and a vehicle module 942. The vehicle module 942 generates vehicle data (such as vehicle speed, engine speed, and failure information), and outputs the generated data to the in-vehicle network 941.

The basic principle of the present disclosure has been described above in conjunction with particular embodiments. However, as can be appreciated by those ordinarily skilled in the art, all or any of the steps or components of the method and apparatus according to the disclosure can be implemented with hardware, firmware, software or a combination thereof in any computing device (including a processor, a storage medium, etc.) or a network of computing devices by those ordinarily skilled in the art in light of the disclosure of the disclosure and making use of their general circuit designing knowledge or general programming skills.

Moreover, the present disclosure further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present disclosure. The memory medium includes but is not limited to soft disc, optical disc, magnetic optical disc, memory card, memory stick and the like.

In the case where the present disclosure is realized with software or firmware, a program constituting the software is installed in a computer with a dedicated hardware structure (e.g. the general computer 2400 shown in FIG. 24) from a storage medium or network, wherein the computer is capable of implementing various functions when installed with various programs.

Figure 24:
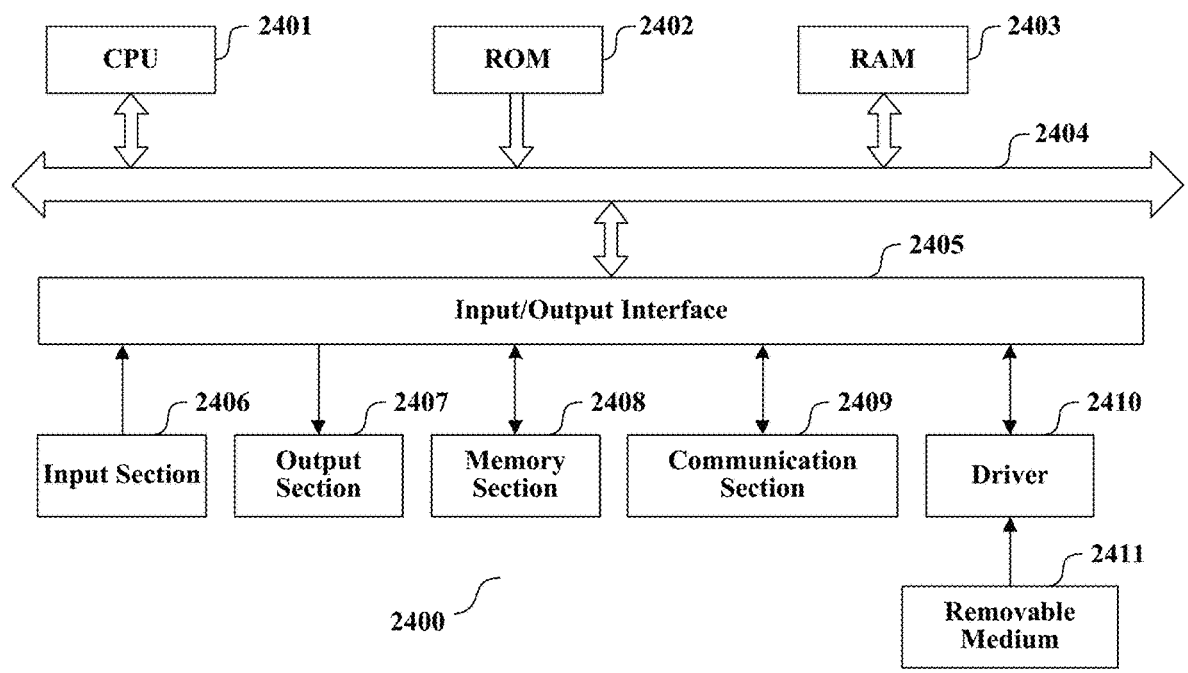
FIG. 24 is a block diagram of an exemplary block diagram illustrating the structure of a general purpose personal computer capable of realizing the method and/or device and/or system according to the embodiments of the present disclosure.

In FIG. 24, a central processing unit (CPU) 2401 executes various processing according to a program stored in a read-only memory (ROM) 2402 or a program loaded to a random access memory (RAM) 2403 from a memory section 2408. The data needed for the various processing of the CPU 2401 may be stored in the RAM 2403 as needed. The CPU 2401, the ROM 2402 and the RAM 2403 are linked with each other via a bus 2404. An input/output interface 2405 is also linked to the bus 2404.

The following components are linked to the input/output interface 2405: an input section 2406 (including keyboard, mouse and the like), an output section 2407 (including displays such as a cathode ray tube (CRT), a liquid crystal display (LCD), a loudspeaker and the like), a memory section 2408 (including hard disc and the like), and a communication section 2409 (including a network interface card such as a LAN card, modem and the like). The communication section 2409 performs communication processing via a network such as the Internet. A driver 2410 may also be linked to the input/output interface 2405, if needed. If needed, a removable medium 2411, for example, a magnetic disc, an optical disc, a magnetic optical disc, a semiconductor memory and the like, may be installed in the driver 2410, so that the computer program read therefrom is installed in the memory section 2408 as appropriate.

In the case where the foregoing series of processing is achieved through software, programs forming the software are installed from a network such as the Internet or a memory medium such as the removable medium 2411.

It should be appreciated by those skilled in the art that the memory medium is not limited to the removable medium 2411 shown in FIG. 24, which has program stored therein and is distributed separately from the apparatus so as to provide the programs to users. The removable medium 2411 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 2402 and the memory section 2408 in which programs are stored, and can be distributed to users along with the device in which they are incorporated.

To be further noted, in the apparatus, method and system according to the present disclosure, the respective components or steps can be decomposed and/or recombined. These decompositions and/or re-combinations shall be regarded as equivalent solutions of the disclosure. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n) . . . " in which an element is defined will not preclude presence of an additional identical element(s) in a process, method, article or device comprising the defined element(s)" unless further defined.

Although the embodiments of the present disclosure have been described above in detail in connection with the drawings, it shall be appreciated that the embodiments as described above are merely illustrative rather than limitative of the present disclosure. Those skilled in the art can make various modifications and variations to the above embodiments without departing from the spirit and scope of the present disclosure. Therefore, the scope of the present disclosure is defined merely by the appended claims and their equivalents.

The invention claimed is:

1. An electronic apparatus for wireless communications, comprising:
   processing circuitry, configured to:
   determine a plurality of partial sensing windows separated from each other in a time domain,
   wherein in the plurality of partial sensing windows, a user equipment performing sidelink communications senses at least a part of time-frequency resources in a resource pool for the sidelink communications; and
   determine a partial sensing-resource selection window and one or more resource selection windows,
   wherein the partial sensing-resource selection window is a time-frequency window defined by a plurality of previous partial sensing windows after triggering resource selection, an occupancy state of time-frequency resources in the partial sensing-resource selection window is known to the user equipment, and the user equipment selects time-frequency resources in the one or more resource selection windows to perform the sidelink communications,
   wherein the partial sensing-resource selection window covers the one or more resource selection windows,
   wherein, in a case that the user equipment performs a hybrid automatic retransmission request (HARQ) transmission, the processing circuitry is further configured to determine, based on a maximum number of times of transmission of a single data packet in the HARQ transmission, a lower limit of a time domain size of the partial sensing-resource selection window.

2. The electronic apparatus according to claim 1,
   wherein the processing circuit is configured to determine the lower limit of the time domain size of the partial sensing-resource selection window as a product of a difference obtained by subtracting 1 from the maximum number of times of transmission and a time interval between two transmissions of the single data packet,
   wherein the time interval between the two transmissions is a maximum time interval, a minimum time interval or an average time interval between each two transmissions in the HARQ transmission; or
   wherein the processing circuit is configured to determine the lower limit of the time domain size of the partial sensing-resource selection window as a total time domain size of resource selection windows crossed by a HARQ transmission having the maximum number of times of transmission.

3. The electronic apparatus according to claim 1,
   wherein the partial sensing-resource selection window has a same size in the time domain as the partial sensing window; and
   wherein the partial sensing windows, the partial sensing-resource selection window and the one or more resource selection windows are discontinuous in the time domain.

4. The electronic apparatus according to claim 3, wherein an upper limit of the time domain size of the partial sensing-resource selection window is equal to a maximum allowable transmission delay of a data packet.

5. The electronic apparatus according to claim 1, wherein the processing circuitry is further configured to:
   in a case of sensing that the selected time-frequency resources are occupied, activate a resource reselection window to perform resource reselection, and transmit data only on time-frequency resources corresponding to an overlapping part of the resource reselection window and the partial sensing-resource selection window; and
   in a case of determining to perform retransmission and thus it is required to activate a new resource selection window to perform the retransmission in the HARQ transmission, transmit data only on time-frequency resources corresponding to an overlapping part of the new resource selection window and the partial sensing-resource selection window.

6. The electronic apparatus according to claim 5, wherein the processing circuitry is further configured to:
   in a case that no time-frequency resources suitable for transmitting the data can be selected on the time-frequency resources corresponding to the overlapping part of the resource reselection window and the partial sensing-resource selection window, terminate transmission of a block to be transmitted.

7. The electronic apparatus according to claim 1, wherein the processing circuitry is further configured to:
   in a case of sensing that the selected time-frequency resources are occupied, activate a resource reselection window to perform resource reselection; and
   in a case of determining to perform retransmission in the HARQ transmission:
      activate a new resource selection window to perform the retransmission;
      select time-frequency resources from among time-frequency resources within a coverage range of the resource reselection window and outside of a coverage range of the partial sensing-resource selection window to perform data transmission; or
      select time-frequency resources from among time-frequency resources within a coverage range of the new resource selection window and outside of a coverage range of the partial sensing-resource selection window to perform data transmission, and
   wherein the time-frequency resources are selected in one of the following manners:
      performing random selection, or
      performing selection based on a resource sensing result in the partial sensing-resource selection window, or
      performing selection based on a resource sensing result in the resource reselection window, or
      performing selection based on a resource sensing result in the resource selection window.

8. The electronic apparatus according to claim 7, wherein the processing circuitry is configured to, in a case that the user equipment performs the sidelink transmissions using randomly selected time-frequency resources and does not perform channel sensing, comprise one of the following information in sidelink control information:
   indication information indicating that the user equipment does not perform channel sensing on the time-frequency resources; or
   priority level information of a data packet,
   wherein the data packet is adjusted to have a highest priority level.

9. The electronic apparatus according to claim 1, wherein the processing circuitry is further configured to:
   perform dynamic adjustment on a frequency domain range of each of the plurality of partial sensing windows.

10. The electronic apparatus according to claim 9, wherein the processing circuitry is configured to:
    receive an adjustment instruction from a base station, and perform the dynamic adjustment based on the adjustment instruction; or
    perform the dynamic adjustment based on a measurement result of the user equipment.

11. The electronic apparatus according to claim 10, wherein the measurement result comprises one or more of: a channel busy ratio and feedback information in the HARQ transmission, and
    wherein the processing circuitry is configured to, in a case that the channel busy ratio increases and a number of times of feedback of NACK or a number of times of timeout without feedback increases in the HARQ transmission, increase the frequency domain range of each of the plurality of partial sensing windows.

12. The electronic apparatus according to claim 7,
    wherein the processing circuitry is configured to receive a resource pool configuration signaling from a base station,
    wherein the resource pool configuration signaling indicates whether the resource pool allows the user equipment not performing channel sensing to perform data transmission, or
    wherein the resource pool configuration signaling configures a part of the resource pool to allow the user equipment not performing channel sensing to perform data transmission,
    wherein the processing circuit is configured to randomly select time-frequency resources on the configured part of the resource pool to perform the sidelink transmission and not perform channel sensing.

13. The electronic apparatus according to claim 1,
    wherein the processing circuitry is further configured to receive sidelink control information from another user equipment,
    wherein the sidelink control information comprises one of the following:
       indication information indicating that the other user equipment does not perform channel sensing on corresponding time-frequency resources; or
       data packet priority level information indicating that data packets transmitted by the other user equipment using the corresponding time-frequency resources have a highest priority level,
    wherein the processing circuitry is configured to cause the user equipment not to occupy the corresponding time-frequency resources to perform data transmission.

14. The electronic apparatus according to claim 1, wherein the processing circuitry is further configured to set an additional sensing window before a starting position of the partial sensing-resource selection window.

15. The electronic apparatus according to claim 14,
    wherein a starting position of the additional sensing window is dependent on a maximum period of each of periodic services which cannot be sensed in the plurality of partial sensing windows,
    wherein the starting position of the additional sensing window is further dependent on requirements of aperiodic services for channel sensing, and
    wherein the processing circuit is configured to determine the maximum period based on service periods that the resource pool for the sidelink communications is capable of supporting.

16. A method for wireless communications performed by an electronic apparatus, the method comprising:
    determining a plurality of partial sensing windows separated from each other in a time domain,
    wherein in the plurality of partial sensing windows, a user equipment performing sidelink communications senses at least a part of time-frequency resources in a resource pool for the sidelink communications; and
    determining a partial sensing-resource selection window and one or more resource selection windows,
    wherein the partial sensing-resource selection window is a time-frequency window defined by a plurality of previous partial sensing windows after triggering resource selection, an occupancy state of time-frequency resources in the partial sensing-resource selection window is known to the user equipment, and the user equipment selects time-frequency resources in the one or more resource selection windows to perform the sidelink communications, wherein the partial sensing-resource selection window covers the one or more resource selection windows, wherein, in a case that the user equipment performs a hybrid automatic retransmission request (HARQ) transmission, the method further comprises determining, based on a maximum number of times of transmission of a single data packet in the HARQ transmission, a lower limit of a time domain size of the partial sensing-resource selection window.

\* \* \* \* \*